(12) United States Patent
Chase et al.

(10) Patent No.: US 12,452,493 B2
(45) Date of Patent: Oct. 21, 2025

(54) SYSTEMS AND METHODS FOR OBTAINING AUTOMATED IMAGES IN A LIVE VIDEO EVENT

(71) Applicant: WHATNOT INC., Marina Del Rey, CA (US)

(72) Inventors: Alex Chase, Venice, CA (US); Benjamin L. Brodie, Los Angeles, CA (US)

(73) Assignee: WHATNOT, INC., San Francisco, CA (US)

( * ) Notice: Subject to any disclaimer, the term of this patent is extended or adjusted under 35 U.S.C. 154(b) by 170 days.

(21) Appl. No.: 18/072,416

(22) Filed: Nov. 30, 2022

(65) Prior Publication Data

US 2024/0179376 A1    May 30, 2024

(51) Int. Cl.
*H04N 21/4788* (2011.01)
*H04N 21/478* (2011.01)
*H04N 23/661* (2023.01)

(52) U.S. Cl.
CPC ....... *H04N 21/4788* (2013.01); *H04N 21/478* (2013.01); *H04N 21/4781* (2013.01); *H04N 23/661* (2023.01)

(58) Field of Classification Search
None
See application file for complete search history.

(56) References Cited

U.S. PATENT DOCUMENTS 11,432,046 B1 * 8/2022 Ohliger .................. G06V 20/49
2013/0258117 A1 * 10/2013 Penov ..................... G06V 10/24
348/207.1

FOREIGN PATENT DOCUMENTS

WO      WO-2013169539 A1 * 11/2013 ............. G06Q 30/08

* cited by examiner

*Primary Examiner* — Omar S Parra
(74) *Attorney, Agent, or Firm* — MARSHALL, GERSTEIN & BORUN LLP

(57) ABSTRACT

Systems and methods for implementing improvements to "live events," via which a host of the event may offer one or more items to one or more guests in the event (e.g., via auction, via direct purchase, and/or via giveaway). In particular, the host device may automatically capture and/or upload one or more images of the item(s) to one or more servers for processing. The one or more servers in turn may use the processed image to populate the host's item inventory listings, item profiles, packaging labels, etc. for access and display to the host and/or guests.

20 Claims, 18 Drawing Sheets

600⎯

602⎯
PROVIDING ONE OR MORE GRAPHICAL USER INTERFACES TO FACILITATE RESPECTIVE OFFERINGS OF ONE OR MORE ITEMS BY A FIRST USER TO A PLURALITY OF SECOND USERS

604⎯
RECEIVING ONE OR MORE USER INTERACTIONS TO INITIATE A FIRST OFFERING OF A FIRST ITEM FROM AMONG THE ONE OR MORE ITEMS

606⎯
AUTOMATICALLY CAPTURING A FIRST STILL IMAGE ASSOCIATED WITH THE FIRST ITEM

608⎯
TRANSMITTING THE FIRST STILL IMAGE TO ONE OR MORE SERVERS FOR DISTRIBUTION

SYSTEMS AND METHODS FOR OBTAINING AUTOMATED IMAGES IN A LIVE VIDEO EVENT

TECHNICAL FIELD

The present disclosure generally relates to computing device communications, and more specifically, to systems and methods for automatically obtaining images via devices in association with live, video-enabled events.

BACKGROUND OF THE DISCLOSURE

In the field of computing devices such as smartphones, smart tablets, laptops, desktop computers, and the like, recent innovations have produced improvements to graphical display capabilities, touchscreen interactivity, integrated camera hardware, and data processing and transmission rates. Moreover, improvements to cellular communication networks and other wired/wireless communications networks have produced improvements to data transmission speeds, traffic handling capacity, and connection reliability. These and other technological improvements offer opportunities to make various interactive services available via computing devices, those services including, for example, live events of auctions of collectible items such as trading cards, toys, figurines, etc.

In particular, an existing platform available on computing devices, including mobile computing devices, enables a seller or "host" user to offer one, two, three or more items consecutively (e.g., for auction, for direct purchase, and/or for giveaway) via a live event. In the live event, the host device records a real-time video/audio stream, which prospective bidders or "guests" view at their own devices in conjunction with a graphical user interface (GUI) that enables the guests to send and receive communications regarding the auction(s) (e.g., bids, comments, updates to items, etc.) substantially in real-time. The host can use their transmitted video stream to, for example, visually feature a currently offered item and/or other items in the host's collection. At least these aspects of live events provide substantial benefits over conventional systems for online auctions, for example by enabling hosts and guests to send and receive updated information substantially in real-time without the devices having to reload or refresh the GUI by which the devices participate in the event, thus providing uninterrupted, social access to the live event. Further description, including system implementation details for live events, is provided in U.S. Pat. No. 11,196,577, filed Apr. 22, 2021, and U.S. patent application Ser. No. 17/958,305, filed Sep. 30, 2022, which are hereby incorporated by reference herein in their entirety.

However, existing attempts to implement such interactive services present technological shortcomings, at least in relation to obtaining, processing, and/or displaying images of a multitude of items being offered for live events.

SUMMARY

Although the live events described in the foregoing background provide technical and practical advantages, the present description identifies still further improvements that may be made, particularly in providing an automated method/system of capturing one or more images of items being offered (e.g., for auction, for direct purchase, and/or for giveaway) in a live event.

Previous implementations of live event systems enabled an event host to upload images of items to be offered during a live event, thus allowing the items to have a representative image that illustrates to guests what is being offered or has been offered. Although these existing capabilities have recognizable value for both the event host and the guests, the act of manually obtaining and uploading images for every item being offered incurred some difficulties for the host. For hosts whose inventories total a large number of items, this operation could prove cumbersome, resulting in delays experienced by both the host and the guests. Often, hosts would forego this practice, leaving most (if not all) of the items being offered without a representative image for guests. Since hosts with large inventories often use generic titles when going through large inventories (e.g., "lot 1," "lot 2," etc.), guests are often confused as to what items are offered in a live event, and more particular, what items are still available to obtain the live event.

In view of these challenges, the present disclosure at a high level provides systems and methods for automatically capturing, uploading, and/or processing one or more images of each of one or more items being offered during a live event. In various implementations described in the present disclosure, automatic capturing, uploading, and/or processing the one or more images can occur before, during, and/or after the live event, with each implementation offering respective benefits that will be discussed herein. Further, the present disclosure provides systems and methods for the automated population of a host's item inventory listings, item profiles, packaging labels, and/or other aspects of the host's account with the one or more images for display. These capabilities are integrated into existing modes of offering items in the live event (namely, auctions, direct purchase sales, and/or giveaways), which will be described in further detail in the present disclosure.

In embodiments, a computer-implemented method for automatically capturing one or more images is provided, the method being performed via one or more processors of a client computing device of a host user of the live event. The computer-implemented method may include (1) providing, via a display of a first client computing device of a first user, one or more graphical user interfaces to facilitate respective offerings of one or more items by the first user to one or more second users at respective ones of a second plurality of client computing devices; (2) receiving, via the one or more graphical user interfaces presented at the display of the first client computing device, one or more user interactions to initiate a first offering of a first item from among the one or more items; (3) automatically capturing, via a camera unit of the first client computing device, a first still image associated with the first item, wherein automatically capturing the first still image is performed preceding, concurrent, or subsequent to receiving the one or more user interactions to initiate the first offering of the first item; and (4) transmitting, via one or more processors of the first client computing device, the first still image to one or more servers. The computer-implemented method may include additional, fewer, and/or alternate actions, in various embodiments.

In other embodiments, a client computing device is provided, the client computing device being associated with a host user in a live event. The client computing device may include one or more processors, and one or more memories storing non-transitory computer executable instructions. The instructions, when executed via the one or more processors, may cause the client computing device to (1) provide, via the display, one or more graphical user interfaces to facilitate respective offerings of one or more items by the first user to one or more second users at respective ones of a second plurality of client computing devices; (2) receive, via the one or more graphical user interfaces presented at the display, one or more user interactions to initiate a first offering of a first item from among the one or more items; (3) automatically capture, via the camera unit, a first still image associated with the first item, wherein automatically capturing the first still image is performed preceding, concurrent, or subsequent to receiving the one or more user interactions to initiate the first offering of the first item; and (4) transmit the first still image to one or more servers for distribution to the second plurality of client computing devices. The client computing device may be configured to perform additional, fewer, and/or alternate actions, in various embodiments.

In still other embodiments, one or more non-transitory computer readable media are provided. The one or more non-transitory computer readable media may store non-transitory computer executable instructions that, when executed via one or more processors, cause the client computing device to (1) provide, via a display, one or more graphical user interfaces to facilitate respective offerings of one or more items by the first user to one or more second users at respective ones of a second plurality of client computing devices; (2) receive, via the one or more graphical user interfaces presented at the display, one or more user interactions to initiate a first offering of a first item from among the one or more items; (3) automatically capture, via a camera unit, a first still image associated with the first item, wherein automatically capturing the first still image is performed preceding, concurrent, or subsequent to receiving the one or more user interactions to initiate the first offering of the first item; and (4) transmit the first still image to one or more servers for distribution to the second plurality of client computing devices. The one or more non-transitory computer readable media may include additional, fewer, and/or alternate instructions, in various embodiments.

BRIEF DESCRIPTION OF THE FIGURES

The figures described below depict various embodiments of the systems and methods disclosed herein. It should be understood that the figures depict illustrative embodiments of the disclosed systems and methods, and that the figures are intended to be purely exemplary in nature. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
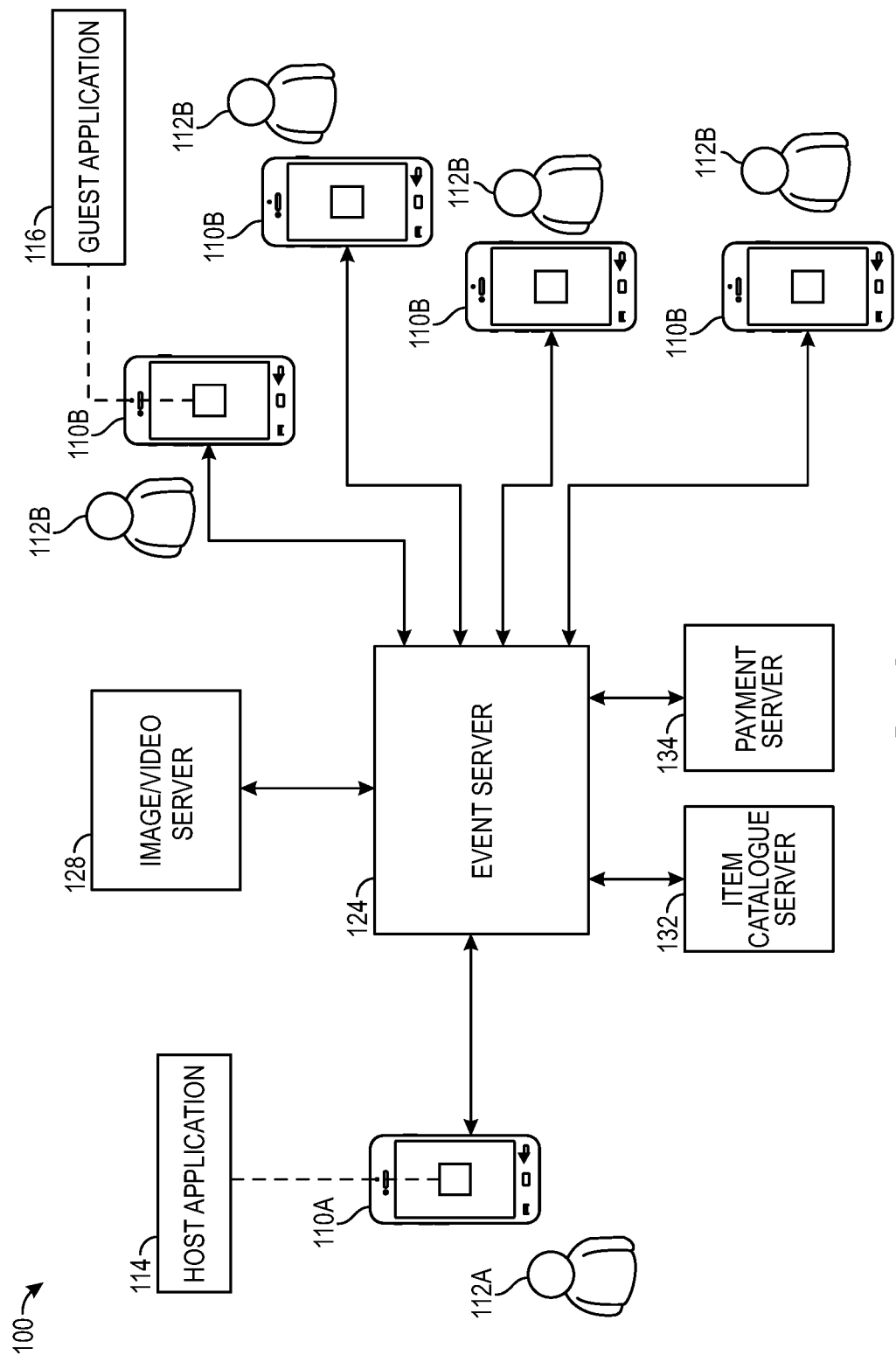
FIG. 1 is a block diagram of an example computing environment.

The figures depict the present embodiments for purposes of illustration only. One skilled in the art will readily recognize from the following discussion that alternate embodiments of the structures and methods illustrated herein may be employed without departing from the principles of the invention described herein.

DETAILED DESCRIPTION

Embodiments of the present description relate to computing systems and methods that, broadly speaking, utilize a software application implemented at electronic computing devices and/or other electronic computing devices, the application allowing "host" users to host a live event to offer (e.g., for auction, for direct purchase, and/or as a giveaway) various items such as trading cards, card packs, toys, figurines, comic books, manga, vintage video games, clothing, tickets, an entry for a contest or giveaway, an opportunity to acquire an item, etc. Embodiments of the present description further relate to particular techniques for assisting the host in obtaining and/or displaying images related to items being offered, which offer improvements over previous implementations of the live event.

A live event enables a host (sometimes referred to herein as a "seller") to offer one or more items to prospective buyers ("guests" in the event) in conjunction with transmitting a real-time video stream from the host's computing device (e.g., a smartphone, a tablet, a laptop, a desktop, etc.). The real-time video stream is ultimately displayed at each of the guests' devices (e.g., smartphones, tablets, laptops, etc. of each guest) in conjunction with real-time information associated with the one, two, three, four or more items (and more particularly, the item currently being offered for auction, direct purchase, etc.).

An "item offering" may be any form of transaction (e.g., an auction, a direct purchase, a giveaway, etc.) of an item from the host to the guest. While items may be offered and/or transacted during live events, "item offerings" may extend to either before, after, or entirely disconnected from live events. For example, an item may be available for direct purchase on the host's profile while no live event is currently live or ever goes live. As another example, the "item offering" may include promotional materials made outside of live events. Promotional materials may include, one or more images (e.g., a single image, a burst image, a video recording, etc.) of the item being offered. As yet another example, item offerings may include video offerings. A video offering may be a non-live, recorded offering of an item that the host may post to their profile.

An extensive description of the implementation of live events, with respect to various example graphical user interfaces (GUIs) for host and guest devices, is provided in U.S. Pat. No. 11,196,577, filed Apr. 22, 2021, and U.S. patent application Ser. No. 17/958,305 filed Sep. 30, 2022. Generally speaking, a live event may make various interactive graphical user interfaces (GUIs) available to guest devices, via which any guest may, for example, competitively bid on, directly purchase, or enter a giveaway of a currently offered item, post comments for viewing by other guests and/or the host in the event, explore other items available from the host, and/or access various other social features all still in conjunction while viewing the real-time video stream at the guest's device. The implementation of any live event may, more particularly, utilize a publish/subscribe messaging architecture, in which one or more servers act as a message broker to distribute messages to hosts and to guests based upon stored registry information and publish/subscribe logic that defines which devices (i.e., which hosts and/or which guests) are to receive particular classes of messages published or generated at the one or more servers during progression of the live event.

To participate in the live event, each host and each guest device forms a persistent connection to the one or more servers (e.g., via a WebSocket), the respective connections thereby enabling each host and each guest to exchange substantially real-time information regarding the live event via the one or more servers without interrupting the transmitting/displaying of the real-time video stream (e.g., without needing to refresh or reload pages). Thus, the live event provides a robust and stable social environment via which users may view and engage in offerings of one, two, three, four, ten, twenty, fifty, one hundred or more items. A live event application as described in the present disclosure can provide various GUIs and/or other functionalities that enable a guest to navigate, find, and join live events (or "live event channels") of a particular host or relating to a particular item or item category that interests the guest (examples of such GUIs are found in U.S. Pat. No. 11,196,577 and U.S. patent application Ser. No. 17/958,305).

Previous implementations of live event systems enabled an event host to manually upload images of items to be offered during a live event (e.g., via a manual camera functionality in the live event application, or via a dedicated camera application of the host's device manually capturing images and selecting the images for upload to the live event application). However, manually capturing and/or uploading images for every item to be offered can prove cumbersome for the host, and can introduce delays from the perspective of the guests. Users who most frequently host live events often are those with the largest inventories, and navigating an inventory of tens, hundreds, or even over a thousand items may prove cumbersome. Delays in selection of the next offered item are passed on to guests, who experience the event as temporarily lacking a current offered item.

Further, because a host's inventory may be so large, it can be difficult for the host (and in some cases, guests) to discern what items have already been offered and which items will be offered. As such, it is not uncommon for hosts to generically label items for live events (e.g., as "lot 1," "lot 2," and so on), rather than taking care to capture/upload images of the items offered and associate respective images with descriptions of the captured items. This may discourage potential guests from joining and/or participating in the live event, as guests may prefer to be able to easily discern which items of interest are being featured in the live event, and more specifically, discern for which items the offerings have not already ended (e.g., which items have not yet been auctioned off, sold, or given away to other guests).

In some embodiments of the present disclosure, instead of requiring the host to manually capture/upload images, the host device may automatically capture one or more images of the items being offered during the live event. The host device may automatically capture the one or more images, before, during, and/or after each respective item is offered in the same live event.

For example, upon initiating the live event and/or an item offering, the host device may automatically capture one or more images of the item and upload the captured one or more images to the one or more servers. This may occur immediately upon initiating the live event and/or the respective item offering, or after a predetermined duration of time after the live event and/or item offering is initiated (e.g., three seconds after the host initiates an item offering). In the embodiments where the one or more images are captured upon a predetermined duration of time after the live event and/or the respective item offering has been initiated, a timer may display on the host device indicating when the device will automatically capture the one or more images (e.g., displaying a countdown at 3, then 2, then 1 at each second interval during the duration of time).

In some embodiments, the capturing and uploading of the one or more images may occur before the item has been offered. Additionally or alternatively, in other embodiments, the capturing and uploading may occur after the respective item offering has ended (e.g., after the item has been auctioned, sold, given away, etc.). For example, the host device may capture the one or more images in a previous live event (e.g., in promotion of a future live event, the host may show items the host intends to offer at a future live event). As another example, the host may make promotional materials for an item the host intends to offer at a future live event (e.g., by hosting a live stream featuring the item for a future offering of the item, by capturing one or more images, burst images, recordings, etc. of the item for promotional dissemination, etc.). As yet another example, the host may make an item offering that is not connected with a live event (e.g., an item offering made on the host's profile for direct purchase, a video offering, etc.). In any of these examples, the host device may automatically capture and upload the one or more images of the item.

In the embodiments where more than one images are captured (e.g., two or more images are captured individually, one or more burst images are captured, one or more videos are recorded, etc.) either the host device or the one or more servers may select the one or more images to be uploaded to the one or more servers and/or processed by the one or more servers. For example, in the instances where a video is recorded and/or a real-time live video is streamed, either the host device or the one or more servers may select one or more frames from the video recording and/or live video stream to be used as the one or more captured images.

The foregoing techniques may be implemented for each respective item in the item queue associated with the live event (e.g., first, second, third items, etc.). In each case, the host device may automatically upload the one or more images (or at least one of the one or more images) to one or more servers to be processed by the one or more servers.

It should be appreciated that while many embodiments, implementations, and/or examples of capturing and uploading the one or more images are described herein to be performed by the host device, any of these embodiments, implementations, and/or examples may be performed by the one or more servers. For example, the one or more servers may remotely control the host device to capture and upload the one or more images of the item. As another example, the host device may send automatic instructions for the host device to capture and upload the one or more images automatically and autonomously. It should also be noted that the one or more images need not be stored locally to the host device in long-term memory.

The one or more servers may process the one or more images in a number of ways. For example, the one or more servers may determine an image quality of the one or more images. Upon receiving the one or more images, the one or more servers may determine that the one or more images are too blurry to be used for one or more of the live event functionalities discussed herein, and in response, may send instructions to the host device to recapture and re-upload one or more images of the item until an image that is sufficiently clear and/or representative of the item has been captured. As another example, when more than one image is uploaded to the one or more servers (e.g., a burst photo, a video clip, etc.), the one or more servers may select a single image from the multiple images, e.g., by selecting a highest-quality image from among the multiple images. As yet another example, the one or more servers may perform any combination of image recognition, text recognition, machine learning, etc. on the one or more images of the item to gather and/or generate metadata of the item (e.g., an item category, type, title, brand, year of production, etc., based upon text and/or other indications present in the one or more images).

Processing the one or more images may additionally or alternatively include populating the host's inventory listings of items (e.g., inventory listings of items currently being offered, inventory listings of items previously offered, and/or inventory listing of items to be offered), profiles of items being offered, previously offered, and/or to be offered, and/or packaging slips of items auctioned, sold, and/or given away to guests with the one or more images (as well as any metadata gathered and/or generated from the one or more images).

Thus, the automatic image capturing feature reduces the complexity of navigating multiple applications and user interfaces for the host in listing items, significantly reduces delays in offering items in the live event, and reduces the confusion on items offered for guests of the live event.

The present description will first provide an example computing environment in which techniques of the present description can be implemented. Subsequently, the present disclosure will describe the automatic capturing and upload of one or more images of an item being offered in the live event. Following the description of the automatic capturing and uploading of the one or more images, additional sections of the present disclosure will describe in further detail the systems and methods for processing the one or more images by the one or more servers, all of which may be applied to auction offerings, direct purchase offerings, giveaway offerings, and/or other modes of offering items. Finally, the present disclosure will describe further examples of systems and methods in view of the other portions of this disclosure.

Exemplary Computing Environment

FIG. 1 depicts a block diagram of an example computing environment 100 via which techniques of the present description may be implemented. In particular, elements of the computing environment 100 may implement live events (e.g., including one or more live auctions, offers for direct purchase, and/or giveaways) and integrate the automatic image capturing features of the present disclosure into the live events to provide representative images of items being offered in the live events. Although various components of the example computing environment 100 will be described below, it should be understood that additional, fewer, and/or alternate components may be envisioned in various embodiments, without necessarily deviating from the techniques described herein.

The computing environment includes a first computing device 110a associated with a first user 112a, and one or more second computing devices 110b associated with respective ones of one or more second users 112b. Computing devices 110a and 110b may include, for example, smartphones, smart tablets, laptops, desktop computers, smart wearable devices, other suitable devices, and/or some combination thereof.

In the example environment 100, the first user 112a represents a "host" of a live event described herein, e.g., a person or entity making one or more items available for auction, direct purchase, and/or giveaway. Accordingly, the first computing device 110a is generally referred to herein as a host device 110a. The second users 112b in this example represent prospective buyers/recipients (or simply "guests") who access the live event via the systems/methods described herein to view items, bid upon or purchase items, and/or perform various other actions described herein. Accordingly, the computing devices 110b are referred to herein as guest devices 110b.

Each of the computing devices 110a and 110b may respectively comprise one or more computer processors and one or more non-transitory computer memories storing instructions that, when executed via the one or more processors, cause the device 110a or 110b to perform the actions attributed to the device 110a or 110b in the present description. In the case of the host device 110a, the one or more non-transitory memories may store one or more software applications 114 ("host application") including one or more sets of non-transitory computer executable instructions that, when executed via the one or more processors, cause the host device 110a to perform actions described herein. Similarly, the one or more memories of each guest device 110b may store one or more software applications 116 ("guest application") including one or more sets of non-transitory computer executable instructions that, when executed via the one or more processors of the guest device 110b, cause the guest device 110b to perform actions described herein. Although host application 114 and guest application 116 are depicted as separate blocks in FIG. 1, it should be understood that applications 114 and 116 may represent separate aspects of the same one or more applications (e.g., a single application stored and executed both at devices 110a and 110b, in which each user 112a or 112b may alternatively operate as a host or guest using the single application). Each of the host device 110a and guest devices 110b may comprise one or more application programming interfaces (APIs) operable for example to (1) generate and display GUIs, (2) capture or otherwise obtain still images and/or videos, (3) display images, videos, item information, and/or other information described herein, (4) communicate with one or more servers (e.g., to receive real-time item information and/or communicate bids/purchases placed via the each device), and/or perform other actions described herein.

The host device 110a (and, in some instances, the guest devices 110b) may comprise one or more camera devices, which may for example capture a real-time video stream for a live event. Additionally, in some embodiments, the host device 110a (and in some instances, the guest devices 110b) includes one or more microphones and/or speaker, which may capture, transmit, and/or play audio (e.g., accompanying audio in a video stream). The one or more camera devices, microphones, and/or speakers may include integrated devices (e.g., a camera, microphone, or speaker natively included in a computing device) and/or devices otherwise communicatively tethered to the host device 110a or guest device 110b (e.g., a peripheral webcam, speaker, or microphone connected wired or wirelessly to the computing device). Additionally, each of the host device 110a and guest devices 110b may include one or more interactive I/O units (e.g., touchscreens, touchpads, keyboard, etc.) enabling navigation of graphical user interfaces, viewing of images and/or videos in the context of a real-time video stream, and/or interactive functionalities described herein.

An event server 124 (i.e., one or more servers) may facilitate communications among devices 110a and 110b, and may store various information associated with implementation of the live events as described herein. For example, the event server 124 may store and distribute information relating to items and/or item queues, and/or implement logic relating to offerings of items via auction, direct purchase, and/or giveaway. Additionally or alternatively, the event server 124 may store and/or distribute still other information such as user profile information, user device configuration information, live event metrics and analytics, etc. The event server 124 may include one or more processors and one or more non-transitory computer readable memories storing instructions that, when executed via the one or more processors, cause the event server 124 to perform the actions described herein.

The event server 124 may communicate with still additional servers to facilitate other functions described herein. For example, an image/video server 128 may facilitate operations of the event server 124 by facilitating provision of the real-time video stream from the host device 110a to the guest devices 110b (e.g., the host device 110a may provide the real-time video to the image/video server 128, which in turn may stream the image/video to the guest devices 110b without the host device 110a needing to be explicitly aware of each of the guest devices 110b). Additionally or alternatively, an item catalogue server 132 may store a listing of known items, from among which hosts 112a may explore and select one or more items to be included for auction in live events. Still additionally or alternatively, a payment server 134 may store and process payment information relating to hosts 112a and/or guests 112b who are to acquire items via the live events described herein. Although each of the event server 124, image/video server 128, item catalogue server 132, and payment server 134 are described in singular herein, it should be understood that each of the one or more servers 124, 128, 132, and 134 may respectively comprise one or more server devices, with functions thereof being distributed among the one or more servers.

Arrows in FIG. 1 represent signal communications exchanged among the elements of the computing environment 100. Elements of the computing environment 100 may communicate via any suitable one or more communications networks (e.g., the Internet, a wired or wireless local area network (LAN), etc.). Elements of the computing environment 100 may communicate of via any suitable one or more communication protocols, including for example a cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of respective elements of the computing environment 100.

Generally, each of the image/video server 128, the item catalogue server 132, and the payment servers 134 may respectively comprise one or more processors and one or more non-transitory memories storing computer executable instructions that, when executed by the one or more processors, cause the one or more servers to perform actions described herein. Although arrows in FIG. 1 connect the computing devices 110a and 110b to the one or more servers 128, 132, and 134 by way of the one or more event servers 124, it should be noted that in some embodiments, the one or more servers 128, 132, and/or 134 may exchange communications directly with the computing devices 110a and 110b. Furthermore, although the one or more servers 124, 128, 132, and 134 are depicted in FIG. 1 as separate elements, it should be understood that functions of the one or more servers 124, 128, 132 and 134 may be combined in various manners, in some embodiments. For example, in some embodiments, the event server 124 is configured to also perform at least some of the functions of the image/video server 128, the item catalogue server 132, and/or the payment server 134.

Subsequent portions of the present description, with reference to FIGS. 2A-2I, 3, 4, 5, 6, 7, 8, 9, and 10 provide examples of communications, GUIs, devices and computer-implemented methods associated with implementation of the functionalities described herein. In various embodiments, described communications, GUIs, actions, etc. may be implemented by suitable components of the computing environment 100 described above. Where interactive GUIs at a computing device are described, interactions with the interactive GUIs may occur, for example, via touchscreen interactions, voice commands, and/or other suitable forms of user input at devices 110a and/or 110b. Described logic, communications, and functionalities may be implemented by way of the event server 124 and/or other servers of FIG. 1 which are in communication with the devices 110a and 110b.

Exemplary Automatic Capture and Upload of One or More Images Before, During, and/or after a Live Event Previous implementations of a live event application generally enabled a host to manually provide an image of the item being offered during a live event. However, in those implementations, the host would have to manually capture (or otherwise obtain) an image (and/or a burst image and/or video) of the item being offered and upload the image (and/or a burst image and/or a video) to the event server for processing and/or dissemination. This process may become overly burdensome when tens, hundreds, or even thousands of items are to be offered during a live event. As such, hosts often forego obtaining and/or uploading images (and/or burst images and/or videos) of the items to the one or more servers. Thus, typically, no image is associated with the item and/or displayed during and/or after the item is offered, and moreover, the item may completely lack metadata indicating the actual item being offered (e.g., an item is labeled "lot 1" rather than being associated with an item name, brand, etc.). The lack of images and/or other metadata associated with an item may cause confusion for guests as to what items are and/or were previously offered in the live event. Further description, including system implementation details for live events, is provided in U.S. Pat. No. 11,196,577, filed Apr. 22, 2021, and U.S. patent application Ser. No. 17/958,305, filed Sep. 30, 2022.

Proposed herein is an alternative implementation to the capture and/or upload of images—before, during, and/or after a live event—of items being offered during a live event. A host may create an item inventory and/or individual item profiles for each item the host intends to offer during a live event. The host may then select one or more items the host intends to offer during the next live event. In some implementations, the host may create an item queue for the live event. Upon selecting an item, the host may add information related to the item and/or the offering of that item (e.g., product name, description, event type (i.e., auction, direct purchase, or giveaway), etc.). Once at least one item has been selected, the host may then initiate the live event. Alternatively, in some embodiments, the host may start the live event to "go live" before adding any of the one or more items to be offered, and add the one or more items during the live event but before initiating the start of the offering of the first item.

At the start of a live event and/or the start of an item offering, the host device may automatically capture one or more images of the item. In some embodiments, the host device may automatically capture the one or more images immediately upon initiating the live event and/or item offering. In some embodiments, the host device may automatically capture the one or more images at a designated duration of time after the live event and/or item offering is initiated (e.g., three seconds after the host initiates the item offering). In some embodiments, the host may designate whether the automatic image capture has a delay from the initiation of the live event and/or item offering (e.g., via the settings of the live event application) as well as the designated time of the delay. In the embodiments where the one or more images are captured and uploaded after the live event and/or the item offerings has been initiated, a timer may display on the host device indicating when the device will automatically capture the one or more images (e.g., displaying 1, then 2, then 3 at each second interval during the duration of time on the host's device). Once the timer reaches the designated time, the timer may trigger and, in response, the host device may automatically capture one or more images of the item. In some implementations, the one or more images captured may be image frames from the real-time video stream of the live event already being streamed by the host device.

In some implementations, the one or more images may be captured and/or uploaded before the live event "goes live" and/or the items are offered during the live event. Additionally or alternatively, the one or more images may be captured and/or uploaded after the live event has ended. It should be noted, though, that in some implementations, the one or more images may be captured and/or uploaded regardless of whether a live event ever "goes live." For example, the host device may capture the one or more images separate from a live stream (e.g., a captured image, burst image, and/or video taken by the camera unit of the host device and stored locally in the host device's memories) and transmit the one or more images to the one or more servers. In these cases, the host device may automatically and sequentially capture images of each respective one of a plurality of items, e.g., by prompting the host to place each respective item in the camera frame one-at-a-time before capturing an image of the respective item and moving on to the next item. Additionally or alternatively, the host device may only transmit a live video stream of the one or items to the one or more servers. In this case, the one or more servers may select one or more images from the frames of the live video stream. This selection may occur immediately at the start of the live video stream and/or a predetermined duration of time after the start of the live video stream.

In some embodiments, the host device may only transmit a live video stream of the one or items to the one or more servers, and the one or more servers may select one or more images from the frames of the live video stream at any point before, during, and/or after the live video stream is "live" (i.e., without the host device itself needing to specifically identify a particular frame to be used as the image). The server may, for example, analyze frames from the live video stream from at and/or around a particular point in time relative to the start of the live event video stream and/or the start of a respective item offering (e.g., frames from approximately three seconds after the start of the respective item offering, for example from two-and-a-half to three-and-a-half seconds after the start of the respective item offering). In these embodiments, the one or more servers may employ focus measure operators, image recognition techniques, machine learning algorithms and/or any other systems, methods, algorithms, techniques, etc. described herein or well known in the field to identify the one or more items and select one or more images from the frames of the live video stream.

Once the host device has captured (or otherwise obtained) one or more images of the item being offered, the host device may automatically transmit the one or more images to the one or more servers via one or more networks. Upon receiving the one or more images, the one or more servers may process the one or more images (e.g., determine if the image is too blurry, select a single image if more than one image and/or video was transmitted, perform image and/or text recognition on the one or more images, etc.). After processing the one or more images, the one or more servers may populate the host's item inventory listings, item pages, packaging labels, and/or other aspects of the host's account with the processed image and/or any metadata generated and/or gathered from the processing of the image, any of which may be accessible and/or viewable by the host and/or guest(s).

Figure 2A:
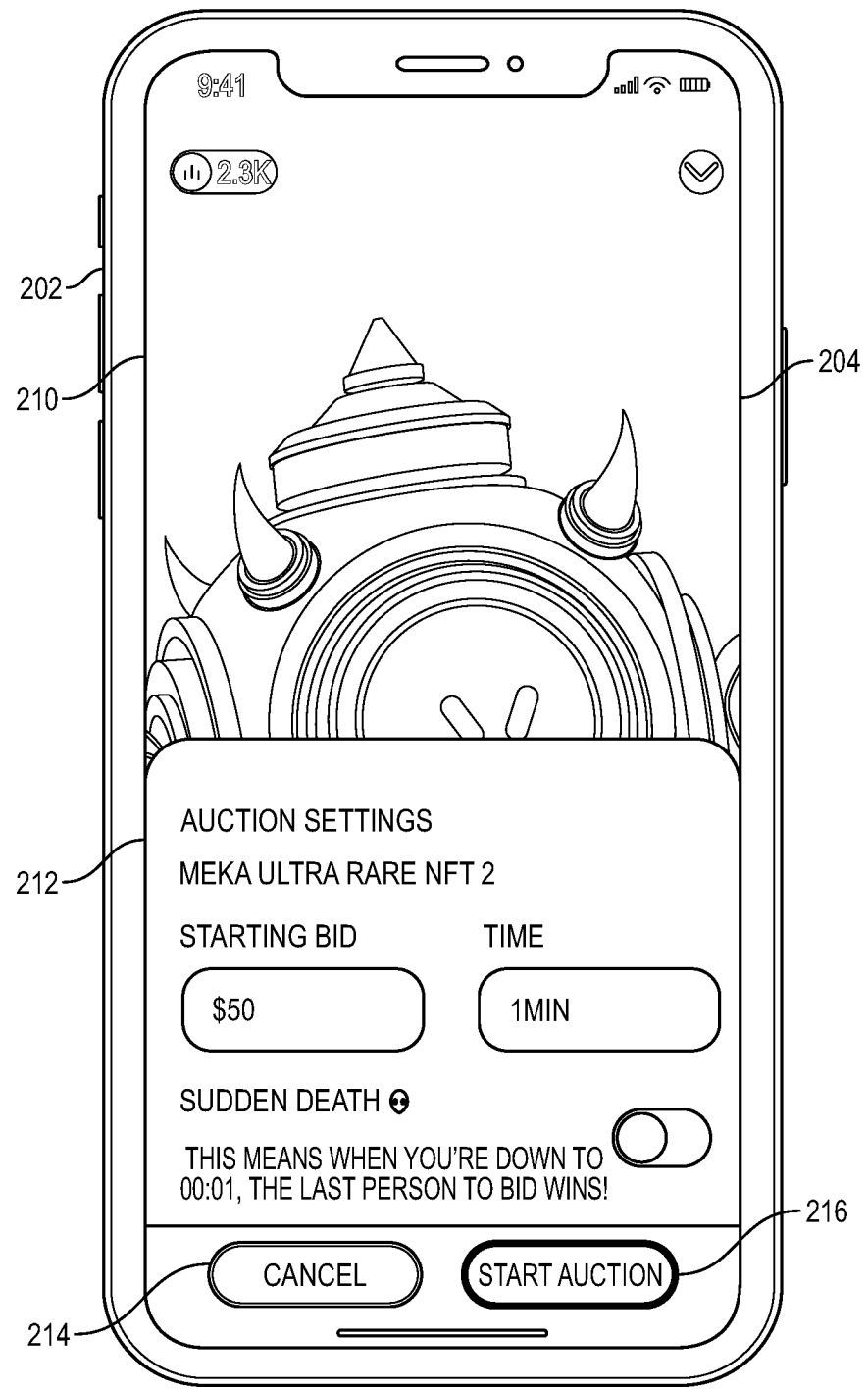
FIG. 2A is an example representation of an auction item initiation graphical user interface (GUI) executing on a computing device.
Figure 2B:
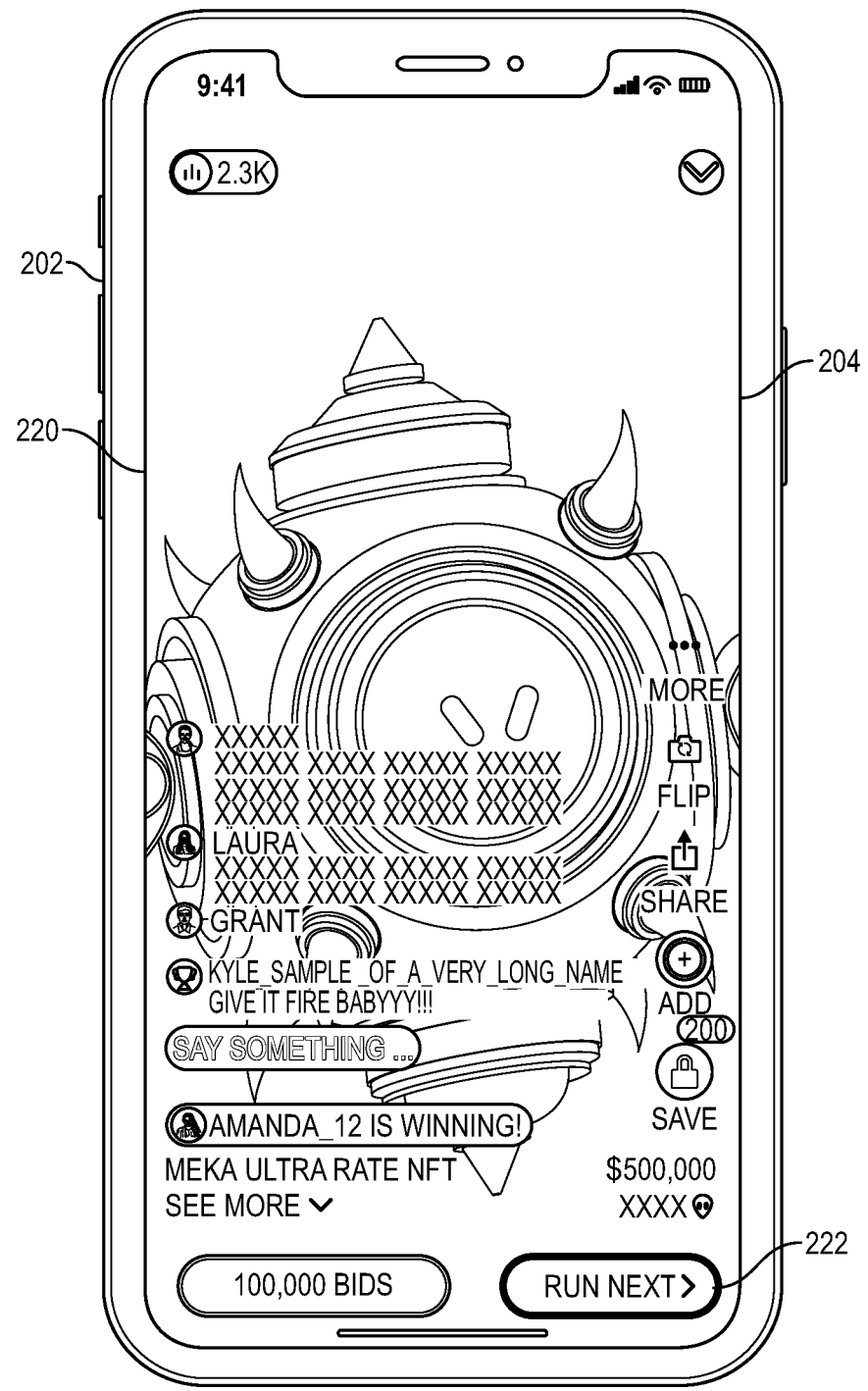
FIG. 2B is an example representation of a run next auction item GUI executing on a computing device.
Figure 2C:
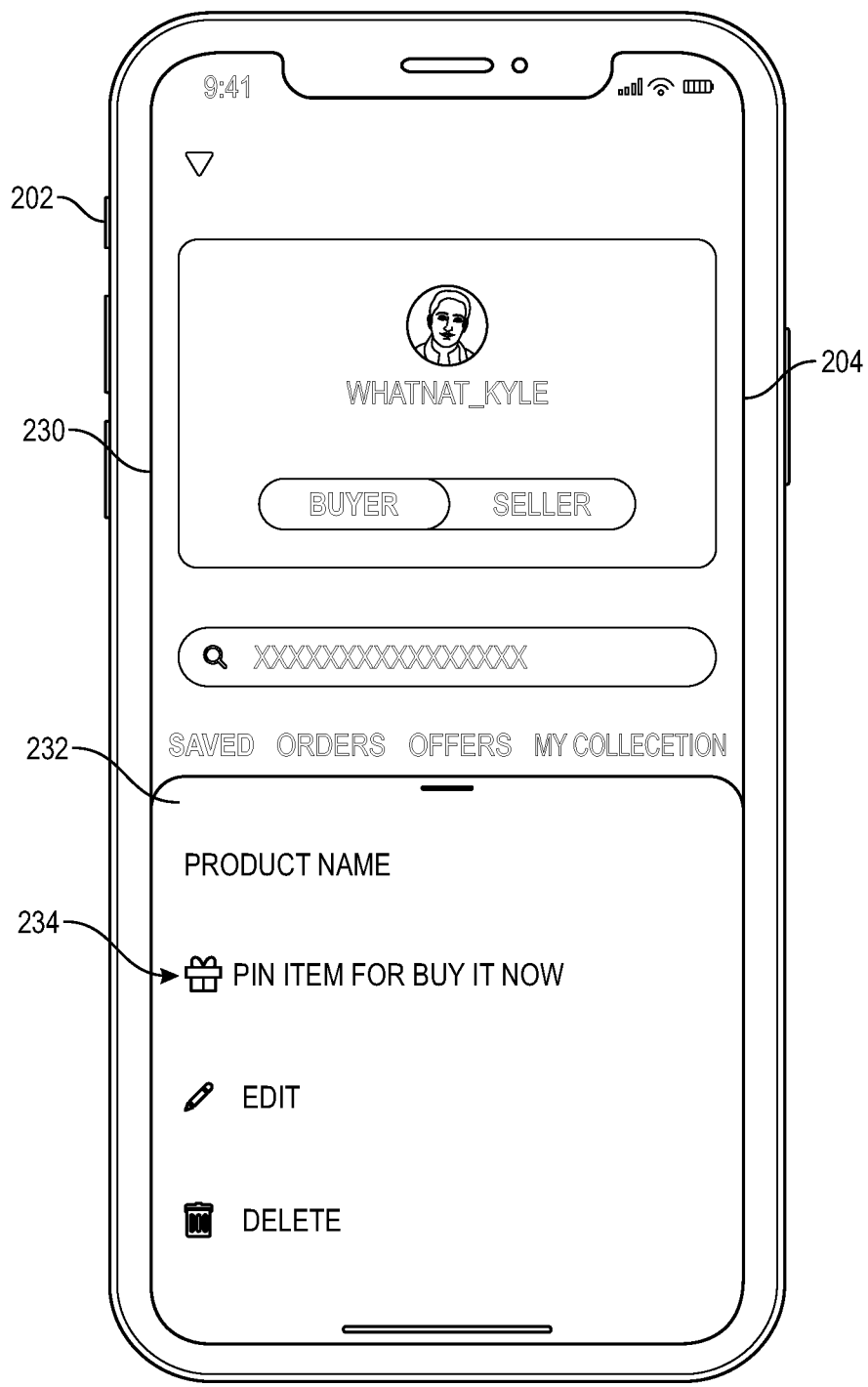
FIG. 2C is an example representation of a direct purchase item initiation GUI executing on a computing device.
Figure 2D:
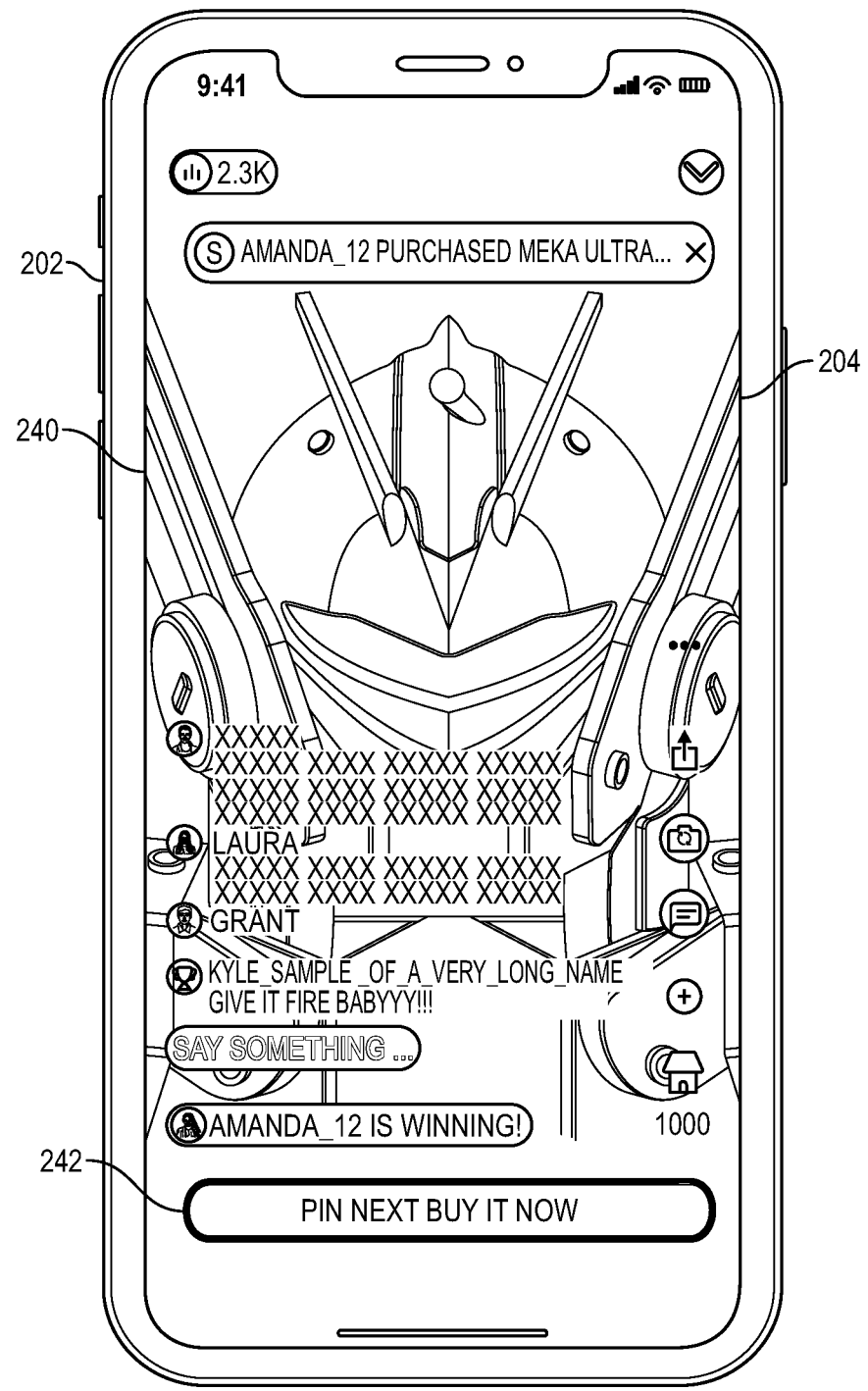
FIG. 2D is an example representation of a live event channel GUI from the host's perspective executing on a computing device.
Figure 2E:
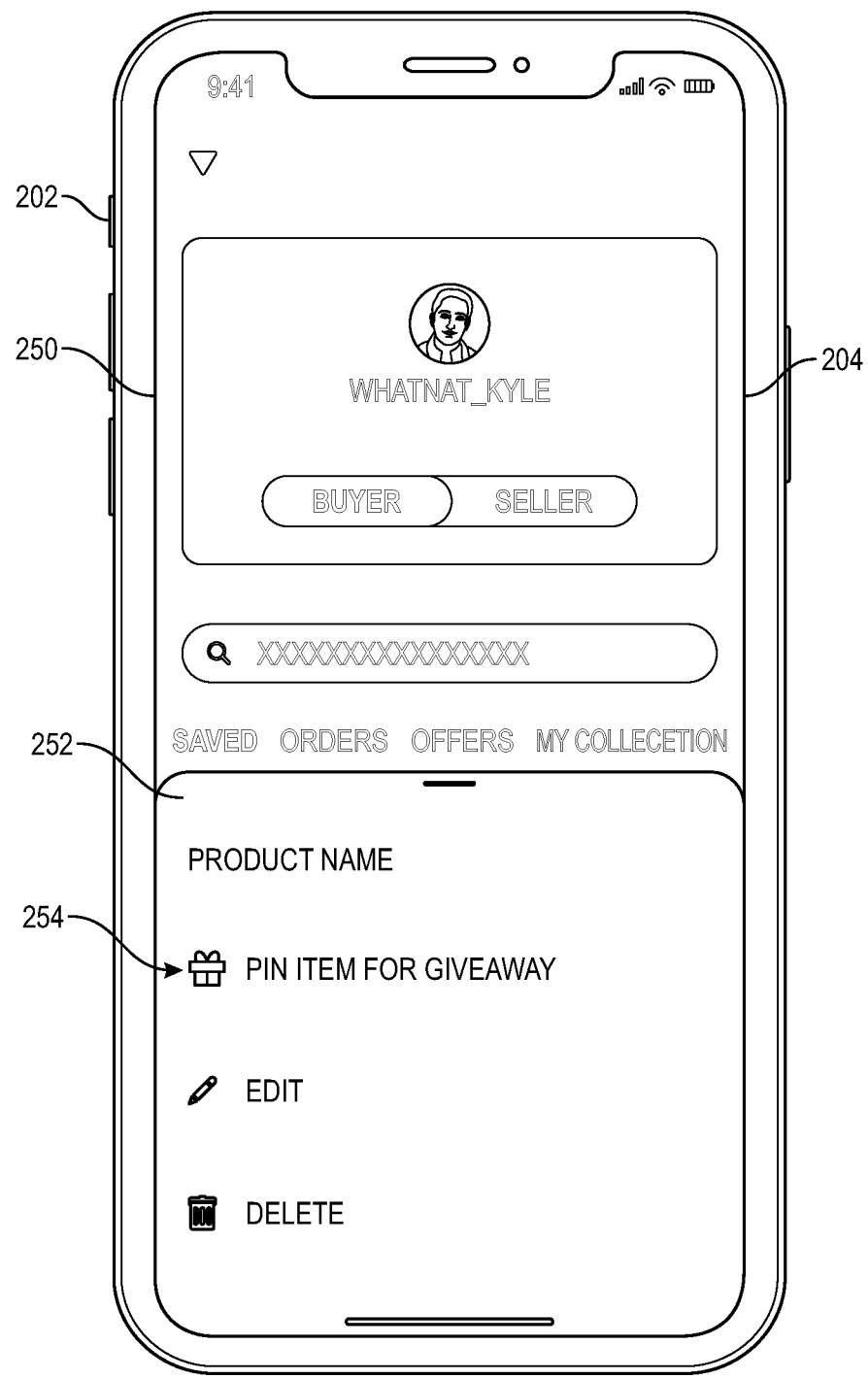
FIG. 2E is an example representation of a giveaway item initiation GUI executing on a computing device.
Figure 2F:
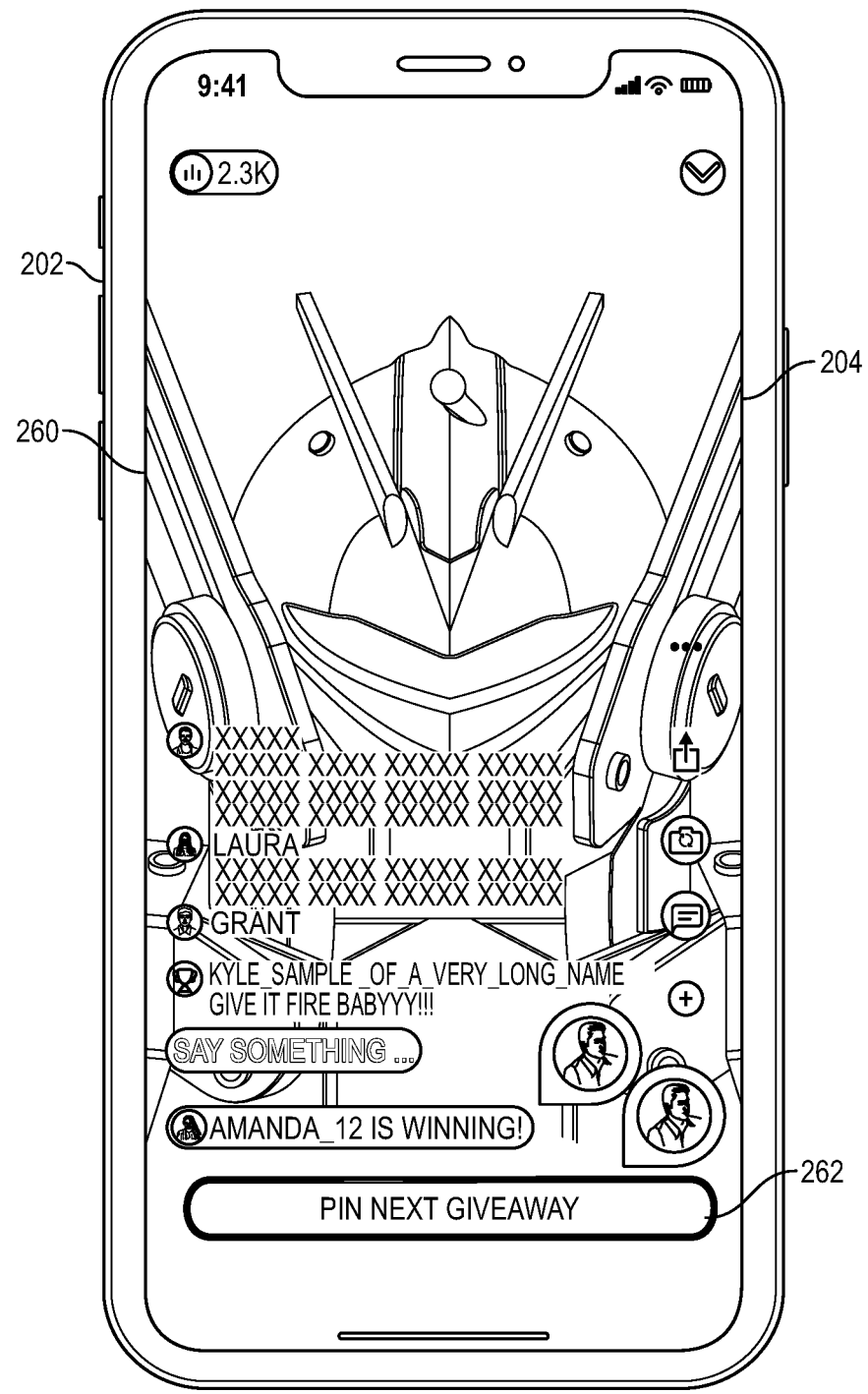
FIG. 2F is an example representation of a live event channel GUI from the host's perspective executing on a computing device.
Figure 3A:
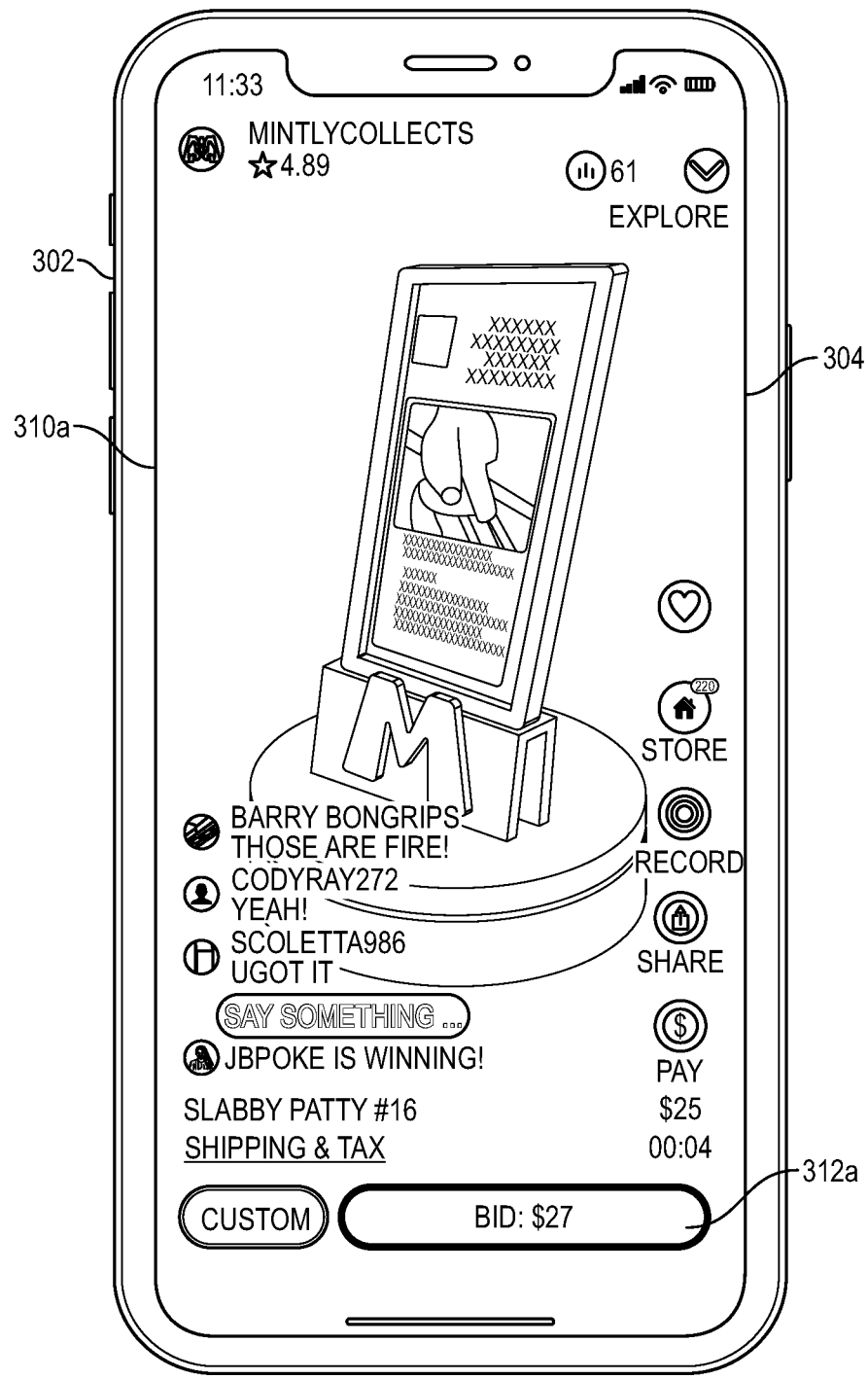
FIG. 3A is an example representation of a live event channel GUI from the guest's perspective executing on a computing device.
Figure 3B:
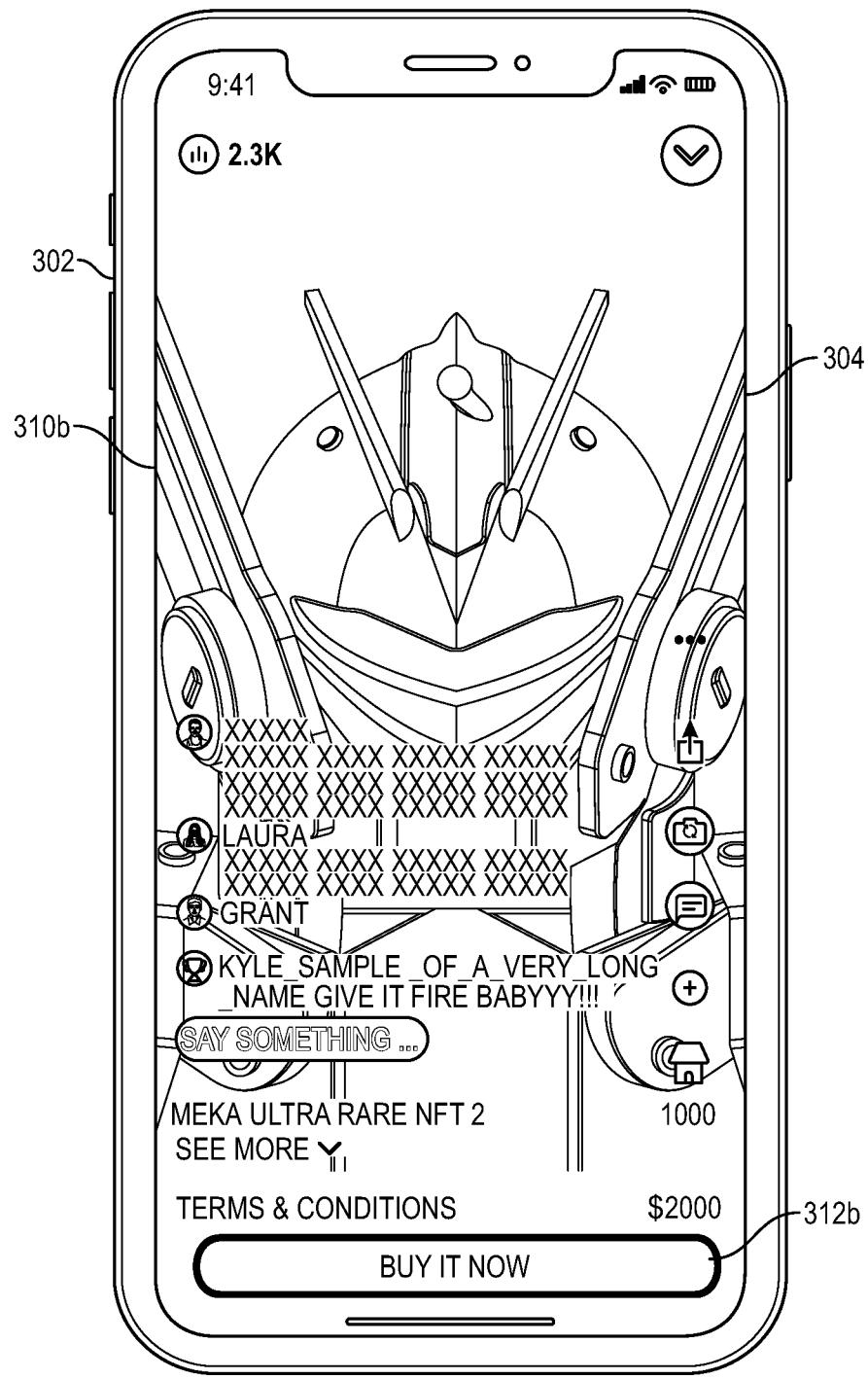
FIG. 3B is an example representation of a live event channel GUI from the guest's perspective executing on a computing device.
Figure 3C:
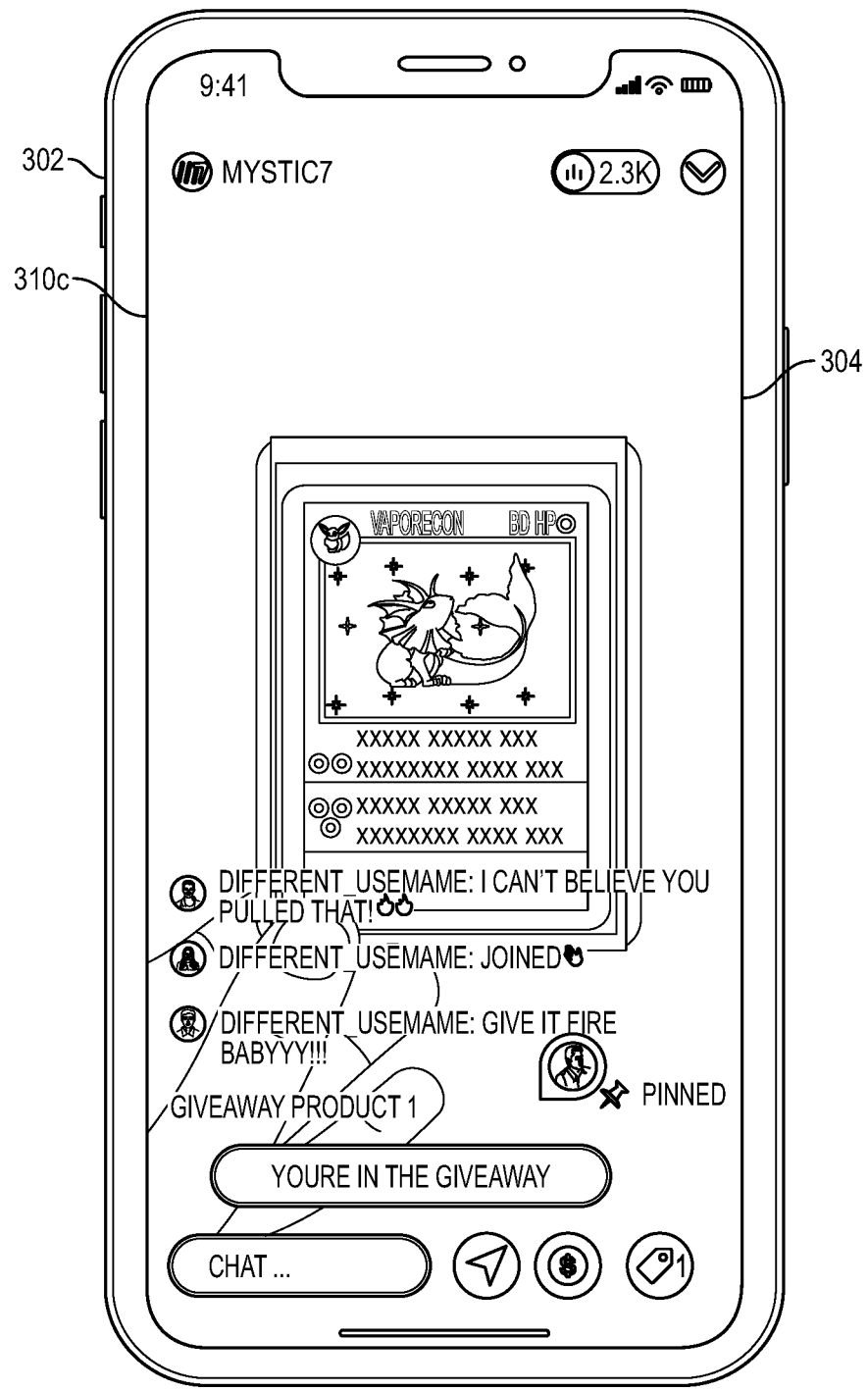
FIG. 3C is an example representation of a live event channel GUI from the guest's perspective executing on a computing device.

Exemplary Implementation of the Automatic Capture and Upload of One or More Images, Before, During, and/or after a Live Event Details of operation of the automatic capture and upload of the one or more images will be provided with respect to FIGS. 2A-2F and 3A-C, which depict example graphical user interfaces (GUIs) that may be displayed at host and/or guest devices in accordance with live events. Particularly, FIGS. 2A-2F depict GUIs displayed at a host device 202, and more particularly at a display 204 thereof (e.g., a touchscreen). FIGS. 3A-3C depict example GUIs displayed at a guest device 302, and more particularly at a display 304 thereof (e.g., a touchscreen). The GUIs of FIGS. 2A-2F and 3A-3C may be displayed at the respective devices 202/302 based upon execution of non-transitory computer-executable instructions included in a live event application (as described herein) stored at the devices 202 and/or 302.

FIG. 2A depicts an example of an auction item initiation GUI 210 via which the live event host may initiate an offering of an item in the form of an auction. Particularly, FIG. 2A depicts an overlay 212 of the auction item initiation GUI 210. The host may review the selections made to the live event auction in the overlay 212. If the host wishes to change aspects of the live auction, the host may select the "Cancel" interactive GUI element 214 or other similar interactive GUI element to return to the previous GUI display where the host may add, delete, and/or change aspects of the auction. If the host wishes to initiate the auction, the host may select the "Start Auction" interactive GUI element 216 or other similar interactive GUI element which may cause the device 202 to start the live auction.

FIG. 2B depicts an example run next auction item GUI 220 via which the live event host may initiate a subsequent live event to be featured in the form of an auction. Upon completing a live auction, the host may initiate a subsequent auction by selecting the "Run Next" interactive GUI element 222 or other similar interactive GUI element which may cause the device 202 to start the subsequent live auction (e.g., as described in U.S. patent application Ser. No. 17/958, 305).

FIG. 2C depicts an example a direct purchase item initiation GUI 230 associated with the item inventory of the host, the inventory being accessible from the host's user profile and/or from within the host's live event channel. Upon selecting an item from the host's item inventory, an overlay 232 provides options to manage, edit, and/or delete the item from the inventory. Particularly, a "pin" option 234 enables the host to set a pinned item as an item to be featured (i.e., offered) in the host's live event for direct purchase. When the "pin" option 234 is selected by the host, the item may be available for direct purchase during the live event.

FIG. 2D depicts another representation of the host's live event channel GUI 240, which allows the host to pin a next direct purchase offering to take place after the conclusion of the offering of a current item. By selecting the "Pin Next Buy It Now" interactive GUI element 242 or other similar interactive GUI element, the host may initiate a subsequent direct purchase offering for the next item during the live event.

FIG. 2E depicts an example a giveaway item initiation GUI 250 associated with the item inventory of the host, the inventory being accessible from the host's user profile and/or from within the host's live event channel. Upon selecting an item from the host's item inventory, an overlay 252 provides options to manage, edit, and/or delete the item from the inventory. Particularly, a "pin" option 254 enables the host to set a pinned item as an item to be featured (i.e., offered) in the host's live event for a giveaway. When the "pin" option 254 is selected by the host, the item may be available as a giveaway during the live event.

FIG. 2F depicts another representation of the host's live event channel GUI 260, which allows the host to pin a next giveaway offering to take place after the conclusion of the offering of a current item. By selecting the "Pin Next Giveaway" interactive GUI element 262 or other similar interactive GUI element, the host may initiate a subsequent giveaway for the next item during the live event. It should be appreciated that the item queuing and pinning techniques described here and above may be implemented, with appropriate modifications in view of the present disclosure, to other modes of offering the item (e.g., an auction). Moreover, use of the pin feature can chain different types of offerings together (e.g., an auction can be pinned during a direct purchase offering, or a giveaway can be pinned during an auction offering).

In some embodiments, still other options are available for the host to further initiate live events and item offerings during the live event. For example, in some implementations, the live event may be initiated without an item queue, in which case the live event will offer an initial item and the host will offer subsequent items only upon the completion of the first item offering. As another example, the live event may be generated from a different GUI than the ones illustrated or described above (for example, from an item profile or from the host's account page). Further implementation details for auction and direct purchase offerings are provided in U.S. Pat. No. 11,196,577, filed Apr. 22, 2021 and further implementation details for giveaway offerings are provided in U.S. patent application Ser. No. 17/958,305, filed Sep. 30, 2022.

Moving to FIGS. 3A-3C, GUIs presented at the guest device 302 enable the guest to enter, view, and participate in live auctions, direct purchases, and/or giveaways. FIG. 3A depicts an auction offering in a live event from a guest's perspective. Another live event channel GUI 310a may include the real-time video stream of the host overlaid with item information as well as other interactive and non-interactive GUI elements (e.g., item information, chats, viewer count, host name, item inventory option, etc.). To place a bid for the item currently offered in the live auction, the guest may select a "Bid" interactive GUI element 312a or other similar GUI element, which is presented in the GUI 310a for as long as the live auction is active and no winner of the auction has yet been determined.

FIG. 3B depicts a live direct purchase from the guest's perspective. Another live event channel GUI 310b may include the real-time video stream of the host overlaid with item information as well as other interactive and non-interactive GUI elements (e.g., item information, chats, viewer count, host name, item inventory option, etc.). To purchase the item currently offered in the live direct purchase, the guest may select a "Buy It Now" interactive GUI element 312b or other similar GUI element, which is presented in the GUI 310b for as long as the direct purchase is active and item being offered has not been purchased (if only one instance of the item is offered) or sold out (if two or more instances of a same item are offered for direct purchase).

FIG. 3C depicts a live giveaway from the guest's perspective. Another live event channel GUI 310c may include the real-time video stream of the host overlaid with item information as well as other interactive and non-interactive GUI elements (e.g., item information, chats, viewer count, host name, item inventory option, etc.). To enter into the random selection for the giveaway, the guest may select an "Enter Giveaway" interactive GUI element (not shown) or other similar GUI element, which is presented in the GUI 310c for as long as the giveaway is active and no winner has yet been selected (e.g., as described in U.S. patent application Ser. No. 17/958,305, filed Sep. 30, 2022).

When the host initiates a live event and/or initiates an item listing in a live event (e.g., as depicted in FIGS. 2A-2F), the live event and/or an item offering in a live event may start and be displayed to one or more guests (e.g., as depicted in FIGS. 3A-3C). Upon initiating the live event and/or an item offering in a live event, the host device may automatically capture and upload one or more images of the item to the one or more servers.

For example, the host may initiate a live event (as illustrated above in FIGS. 2A-2B) and the live event may appear on the guest's device 302 (as illustrated above in FIG. 3A). Once the live event has started, the camera unit of the host device 202 may automatically capture an image at the start of the live event. As another example, the host may initiate a subsequent item for an auction after an initial item for an auction ended. Once the subsequent auction starts, the camera unit of the host device 202 may automatically capture an image at a designated time after the subsequent item offering has been initiated (e.g., three seconds). In some embodiments, as the host device 202 streams video in real-time of the image, the device 202 may select an individual frame of the streamed video to use a representative image of the item being offered. Once the one or more images of the image are captured (or otherwise obtained), the device may upload (or otherwise transmit) the one or more images to the one or more servers.

Exemplary Processing of the One or More Automatically Captured Images

One or more servers (e.g., the event server 124 and/or image/video server 128 of FIG. 1) may process the one or more images. Processing the one or more images may include (i) determining the quality of the one or more images, (ii) selecting a single image from a multitude of images, (iii) analyzing the one or more images for metadata, and/or (iv) populating the host's item inventory listings, item profiles, packaging labels, etc. with the image and/or metadata generated from the image.

The one or more servers may determine the quality of the one or more images via a number of different methods. In some implementations, the one or more servers may utilize any of the following focus measure operators and their accompanying algorithms to determine the focus of the image: gradient-based operators (GRA*), Laplacian-based operators (LAP*), wavelet-based operators (WAV*), statistics-based operators (STA*), discrete cosine transform (DCT) based operators (DCT*), and/or the like. In these implementations, the one or more servers uses any of the foregoing operators and/or algorithms to measure the degree of focus of either a whole image or an image pixel. In some other implementations, the one or more servers may use machine learning, neural networks, deep learning, and/or other artificial intelligence techniques to make a determination if the item in the image can be identified and/or recognized. The one or more servers is not limited to using these foregoing techniques, and other systems, methods, and/or techniques of determining the quality of the image are contemplated. If the quality of the one or more images falls below a set threshold value, the one or more servers may send instructions to the host device 202 to capture another image and/or series of images (as described above). This process may repeat until an image of sufficient quality (i.e., an image that meets the set threshold value) has been obtained by the one or more servers, the host cancels the process (e.g., by ending the live event or the offering of the particular item), or the host overrides the one or more servers (e.g., the host transmits an indication to the one or more servers to use the most recent image captured even if it is below the set threshold value).

When more than one image (e.g., a burst image and/or a video) is received by the one or more servers, the one or more servers may select a single image from series of images. In some implementations, the one or more servers selects a single image based upon the quality of the series of images. In these implementations, the one or more servers may use any of the methods of determining the quality of an image as described above, but may also select the image based on the highest relative quality when the image is compared to the other images obtained. In some other implementations, the one or more servers may not select a single image, and may instead use the series of images (e.g., burst images, video, etc.) for analysis and/or populating the host's item inventory listings, item profiles, packaging labels, etc.

The one or more servers may analyze the one or more images via a number of methods, such as image recognition, machine learning, and/or the like to generate and/or determine metadata related to the item being offered. Image classification, image recognition, and/or image identification techniques may include query by image content (QBIC), optical character recognition (OCR), pattern and/or shape recognition, histogram of oriented gradients (HOG) and/or other object detection methods, one dimensional bar code scanning, two dimensional bar code (or "quick response code" (QR)) scanning, and/or the like. Machine learning techniques may include gradient boosting, neural networks, deep learning, linear regression, polynomial regression, logistic regression, support vector machines, decision trees, random forests, nearest neighbors, and/or any other suitable machine learning technique. The one or more servers is not limited to using these foregoing techniques, and other systems, methods, and/or techniques of identifying the item in the image are contemplated.

In some implementations, upon identifying the item, the one or more servers may perform a search of one or more databases to gather information (i.e., "metadata") related to and/or about the item. Metadata may include names and/or titles of the item, description of the item, dimensions of the item, images of the item, manufacturer and/or distributor information of the item, publication information (if applicable), copyright information (if applicable), collector information (e.g., set information, rarity information, date of release, etc.), logos and/or trademarks (and/or other branding) related to the item (and/or manufacturers and/or distributors of the item), etc. In some implementations, the one or more servers may generate the metadata based on any of the above described machine learning techniques. For example, if the one or more servers cannot find the description of a baseball trading card, the one or more servers may use a script writing artificial intelligence to write a description of the card based on other trading cards, the name of the baseball player depicted, and/or information pulled about said baseball player across one or more databases. The one or more servers may also determine the condition of the item by comparing the image of the item to one or more "stock" images across one or more databases.

After processing the image in any of the foregoing ways, the one or more servers may populate the host's item inventory listings, item profiles, packaging labels, etc. with the processed image and/or any metadata gathered and/or generated. The processed image and/or the metadata may then be accessed and viewed by the host and/or guests of the live event. Further, the image and/or the metadata may be editable by the host of the live event (for example, if the description of an item contains a typographical error, the host may be able to edit the description and correct the error).

Exemplary Implementation of the Processing of the Automatically Captured Images

Details of operation of the processing of the one or more images will be provided with respect to FIGS. 4A-4F, which depict example GUIs that may be displayed at host and/or guest devices in accordance with live events. Particularly, FIGS. 4A-4F depict GUIs displayed at a host and/or guest device 402, and more particularly at a display 404 thereof (e.g., a touchscreen). The GUIs of FIGS. 4A-4F may be displayed at the device 402 based upon execution of non-transitory computer-executable instructions included in a live event application (as described herein) stored at the device 402.

Figure 4A:
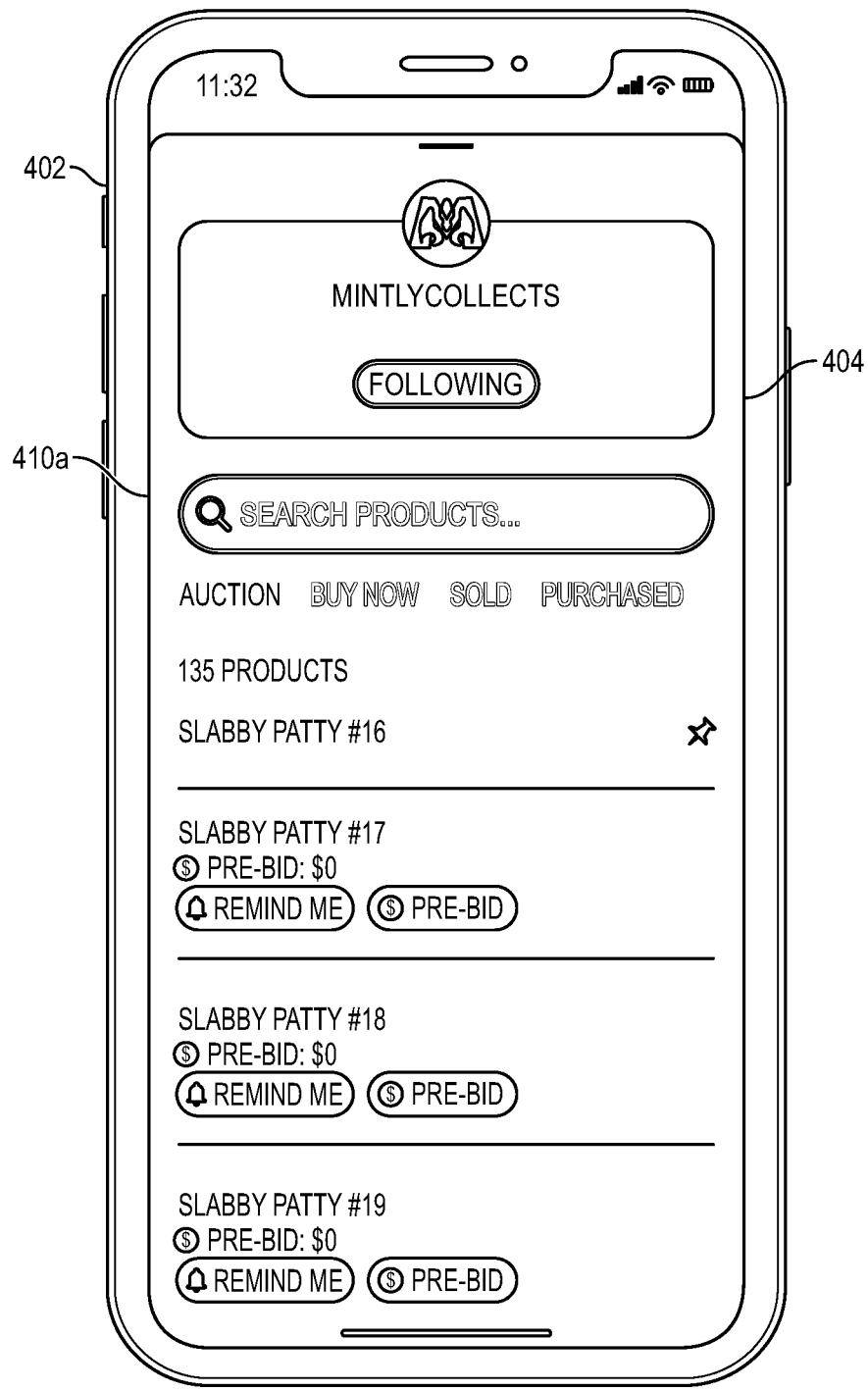
FIG. 4A is an example representation of an item inventory GUI executing on a computing device.

FIG. 4A depicts an example of an item inventory GUI 410a via which the live event host and/or a guest may view the items being offered and/or the items that have been previously offered in the live event. Particularly, the item inventory GUI 410a may allow the host and/or guest to view current and/or upcoming items offered via an auction under the "Auction" tab, current and/or upcoming items offered as via direct purchase under the "Buy Now" tab, and previously offered items under the "Sold" tab. It should be noted that other tabs and interactive GUI elements not depicted are contemplated, such as a "Giveaway" tab that may allow hosts and/or guests to view current and/or upcoming items offered via a giveaway. Other tabs contemplated may include a "Past Auction" tab that may detail the previously offered items sold via an auction, a "Past Buy Now" tab that may detail the previously offered items sold via direct purchase, a "Past Giveaway" tab that may detail the previously offered items via giveaway, among others. The item inventory GUI 410a may extend beyond the display 404 in any direction. The host and/or guest can navigate to the portions item inventory GUI 410a beyond the display 404, for example, by scrolling within the item inventory GUI 410a (e.g., touchscreen scrolling downward to reach items listed that extend below the display 404). Notably, the item inventory GUI 410a depicts the item inventory of the live event before any images have been captured, as no images accompany any of the items listed in the item inventory.

Figure 4B:
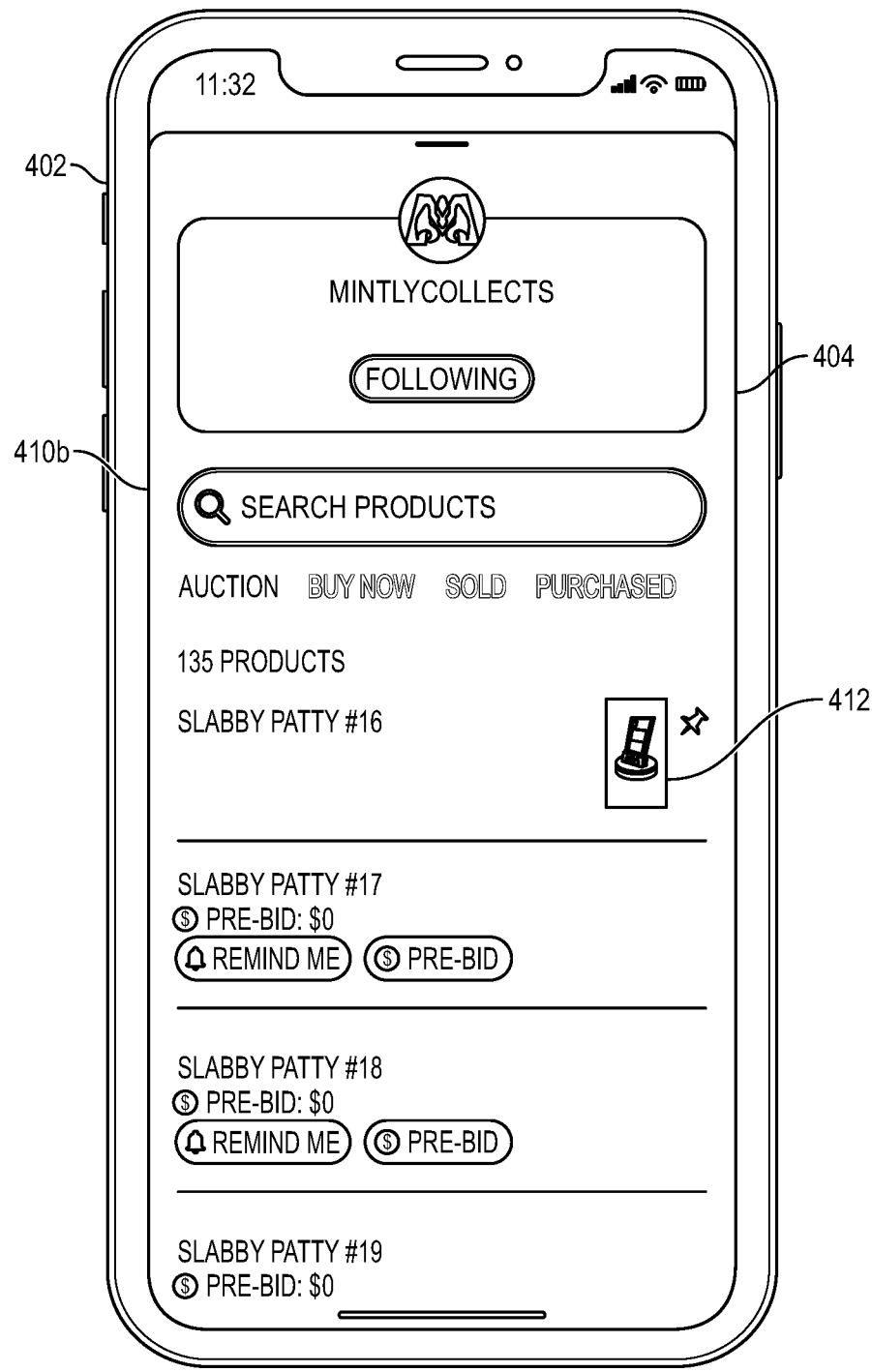
FIG. 4B is an example representation of an item inventory GUI executing on a computing device.

FIG. 4B depicts another example of an item inventory GUI 410b via which the live event host and/or a guest may view the items being offered and the items that have been previously offered in the live event. Notably, the item inventory GUI 410b depicts the item inventory of the live event after the one or more images have been captured and uploaded to the one or more servers, as an item image 412 accompanies the items currently being offered during the live event in the item inventory.

Figure 4C:
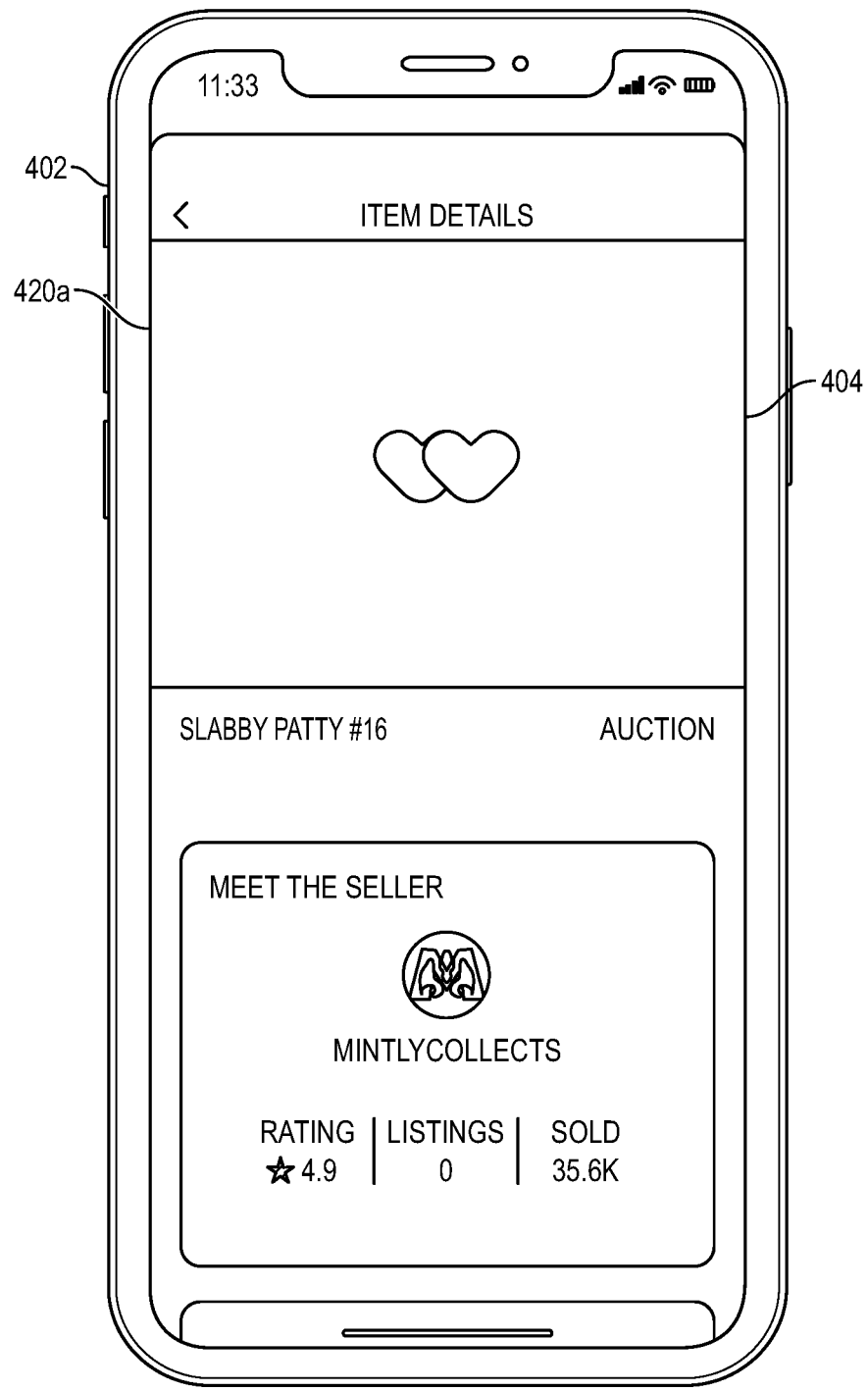
FIG. 4C is an example representation of an item profile GUI executing on a computing device.

FIG. 4C depicts an example of an item profile GUI 420a via which the live event host and/or a guest may view the profile of an item that is being offered and/or has been previously offered in the live event. The item profile GUI 420a may display various information and/or data related to the item. For example, the item profile GUI 420a may display an image of the item, the name and/or title of the item, a description of the item, the type of live event the item will be offered (e.g., auction), and/or the host's information (e.g., name, profile picture, rating, number of items currently being offered in a live event, number of items previously offered, etc.). Notably, the item profile GUI 420a depicts the item profile before any images have been captured, as no images are displayed in the item profile.

Figure 4D:
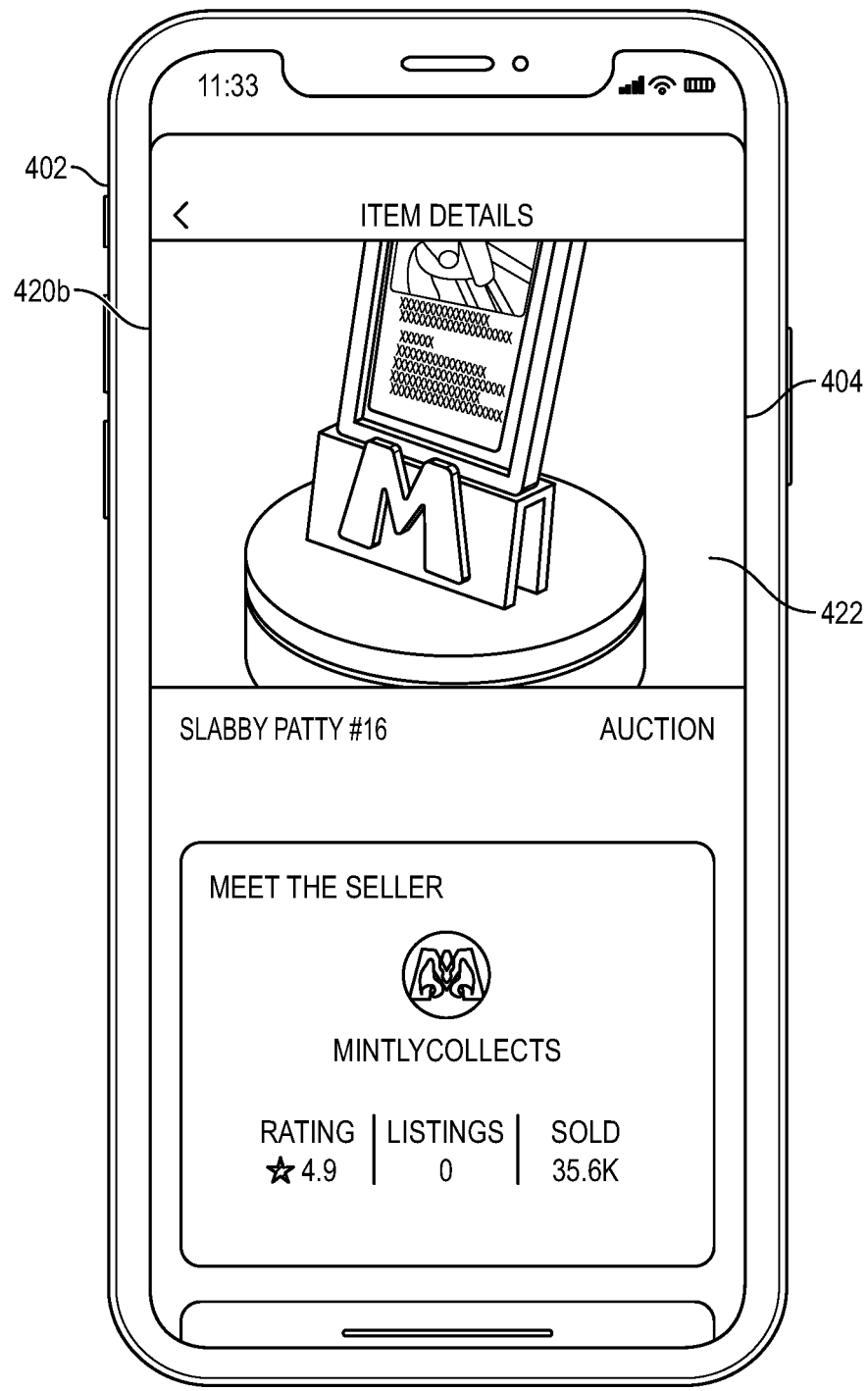
FIG. 4D is an example representation of an item profile GUI executing on a computing device.

FIG. 4D depicts another example of another item profile GUI 420b via which the live event host and/or a guest may view the profile of an item that is being offered and/or has been previously offered in the live event. Notably the item profile GUI 420b depicts the item profile after the one or more images have been captured and uploaded to the one or more servers, as an item image 422 is displayed in the item profile.

Figure 4E:
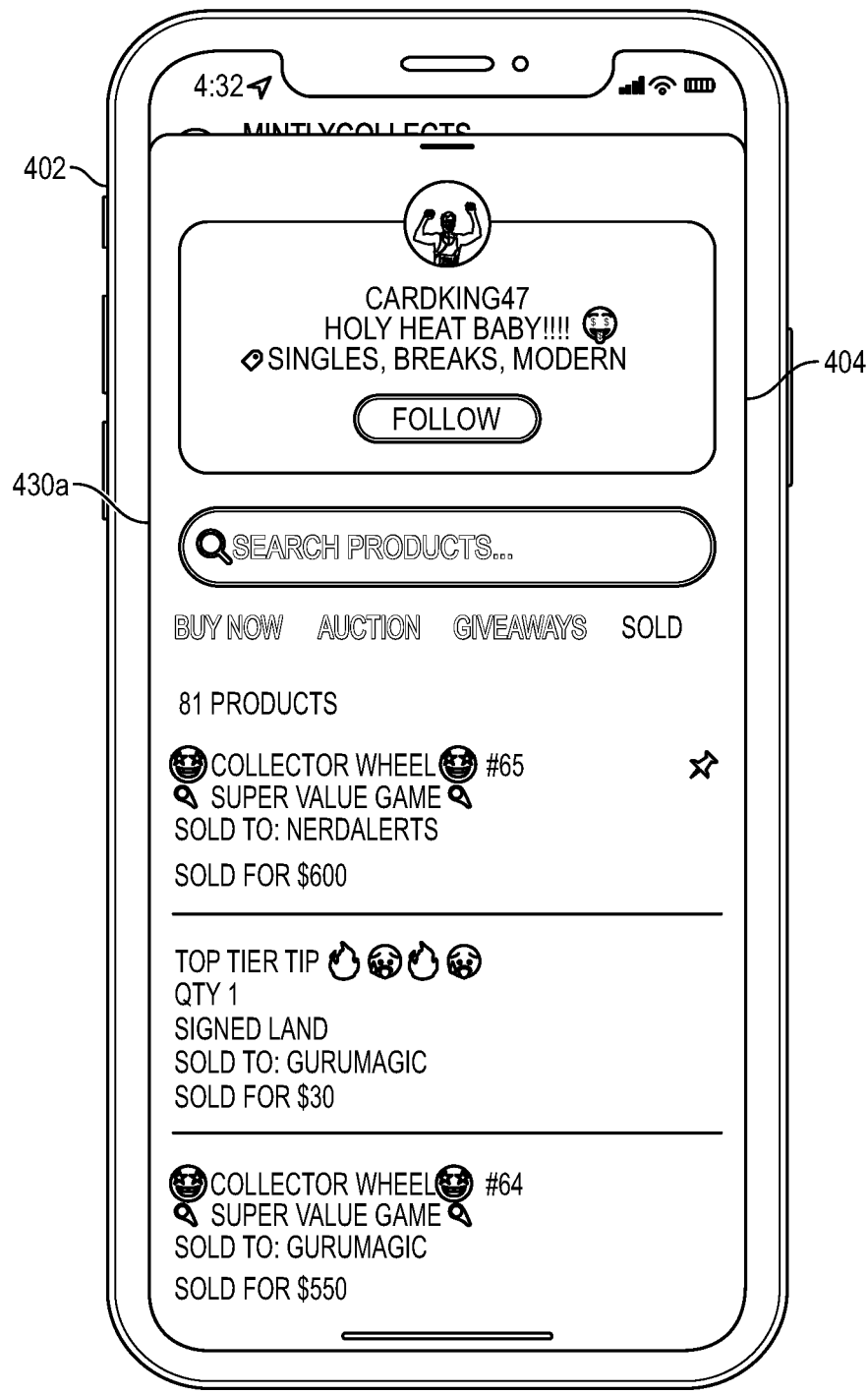
FIG. 4E is an example representation of an item inventory GUI executing on a computing device.

FIG. 4E depicts an example of an item inventory GUI 430a via which the live event host and/or a guest may view the items being offered and the items that have been previously offered in the live event. Specifically, FIG. 4E illustrates the "Sold" tab of the item inventory GUI 430a. Notably the host of the live event has not captured and/or uploaded any images of the items previously offered during the live event, as no images are displayed in the item inventory listing.

Figure 4F:
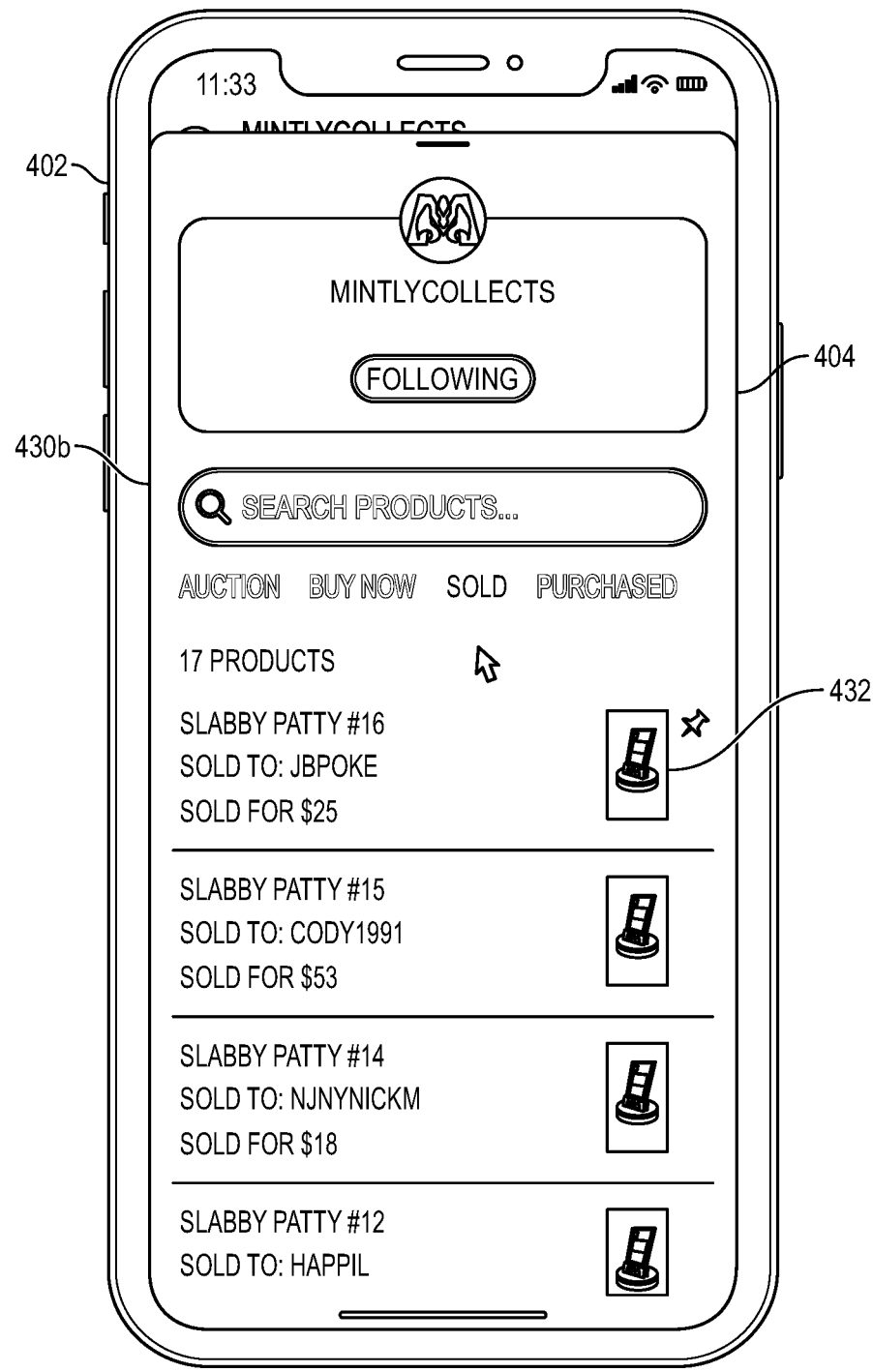
FIG. 4F is an example representation of an item inventory GUI executing on a computing device.

FIG. 4F depicts another example of another item inventory GUI 430b via which the live event host and/or a guest may view the items being offered and the items that have been previously offered in the live event. Similarly to FIG. 4E, FIG. 4F illustrates the "Sold" tab of the item inventory GUI 430a. Notably the host of the live event has captured and uploaded one or more images of each item previously offered during the live event, as an image is displayed next to each item in the item inventory listing.

When the host initiates a live event and/or an item offering during a live event, the host's item inventory listings, item profiles, etc. may not yet have an image representative of the item being offered (in accordance with implementations of FIGS. 4A, 4C, and 4E and similar implementations not illustrated). Upon initiation of the live event and/or item offering, the host device may automatically capture one or more images of the item and upload (or otherwise transmit) the one or more images to the one or more servers, as described above. In some implementations, the host device may automatically capture the one or more images prior to and/or after the live event and/or item offerings, as described above. The one or more servers may process the one or more images into a processed image and/or gather and/or generate metadata related to the processed image. The one or more servers may then populate the host's item inventory listings, item profiles, packaging labels, etc. (in accordance with implementations of FIGS. 4B, 4D, and 4F and similar implementations not illustrated) with the processed image and/or metadata gathered and/or generated.

For example, the host may initiate an auction (as illustrated above in FIGS. 2A-2B) and the live event may appear on the guest's device 302 (as illustrated above in FIG. 3A). The host may select multiple items to be auctioned off, each of which may enter the item queue without an image and may be viewed in the host's item inventory listing (as illustrated above in FIGS. 4A and 4E). Once the live event has started, the camera unit of the host device 202 may automatically capture an image at the start of the live event and transmit the captured image to the one or more servers. Upon receiving the captured image, the one or more servers may then populate the host's item inventory listing with the image (as illustrated above in FIGS. 4B and 4F).

As another example, the host may initiate a subsequent item for an auction after a prior item for an auction ended. The subsequent item offering may start without a representative image uploaded, and the item may have an item profile without an image (as illustrated above in FIG. 4C). Once the subsequent auction starts, the camera unit of the host device 202 may automatically capture a burst image at the start of the subsequent item offering and transmit the captured burst image to the one or more servers. Upon receiving the captured burst image, the one or more servers may select a single image from the burst image and may analyze the single image via image recognition. The analysis of the single image may generate and/or determine a description of the item. The one or more servers may then populate the item profile with the image (as illustrated above in FIG. 4D) and/or description of the item (not shown).

Exemplary Computing Device and Server

Figure 5:
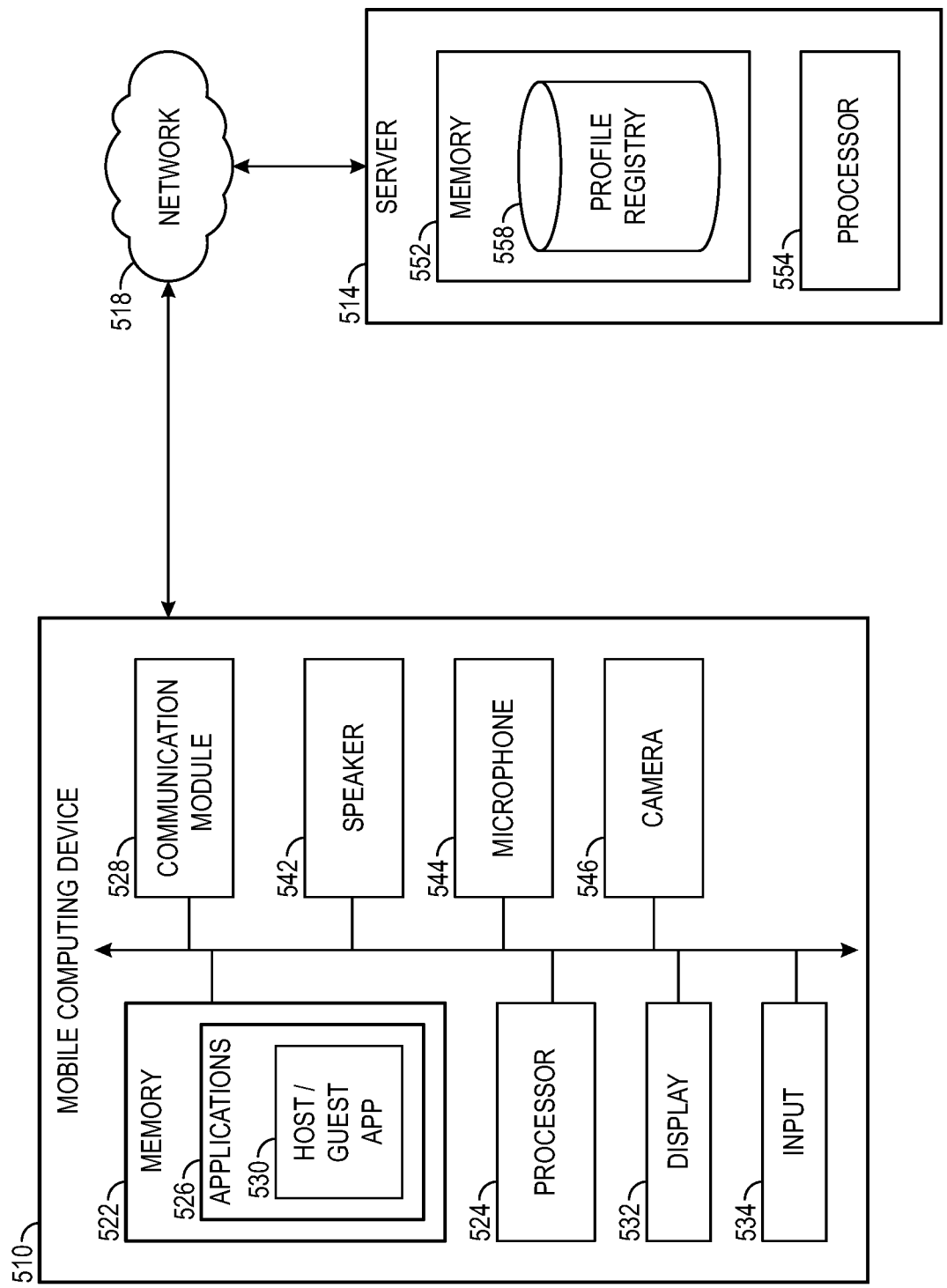
FIG. 5 is a block diagram of an example computing device and server.

FIG. 5 depicts a block diagram of example components of a computing device 510 and one or more servers 514 communicating over a network 518, in accordance with embodiments of the systems and methods described herein. The computing device 510 may correspond, for example, to any of the computing devices of the present description (e.g., the host device 110a, 202, or 402, the guest device 110b, 302, etc.). The one or more servers 514 may correspond, for example, to the event server 124, and/or to another one or more servers (e.g., servers 124, 128, 132, 134, etc.) of the present description. The computing device and/or server 514 may include additional, fewer, or alternate components to those described in this section, in various embodiments. Additionally, in some embodiments, the computing device 510 may be substituted for other computing device(s), e.g., a desktop computer or laptop computer.

The computing device 510 may include a memory 522, which may include one or more non-transitory memories (e.g., ROM) and/or one or more volatile memories (e.g., RAM). In particular, non-transitory portions of the memory 522 may store non-transitory, computer executable instructions that are executable by a processor 524 (i.e., one or more processors) to cause the computing device 510 to perform actions described in this detailed description. Non-transitory portions of the memory 522 may include one or more applications 526. Each respective application 526 may include one or more sets of non-transitory computer executable instructions that, when executed by the processor 524, cause the computing device 510 to perform operations associated with the respective application 526 (e.g., operations involving the processor 524, a communication module 528, and/or other components of the computing device 510 discussed herein). The one or more applications may include a live event application 530 ("Host/Guest App") usable to access live events as described herein.

The computing device 510 may include a display unit 532 (i.e., one or more display devices, such as a touch-enabled visual display ("touchscreen") or other visual display). The computing device may further include an input unit 534 (i.e., one or more user input devices, e.g., a touchscreen or touchpad, a keyboard, a mouse, etc.). In some embodiments, aspects of the display unit 532 and 534 are integrated (e.g., as a touchscreen with both touch input and display capability). The display unit 532 and/or the input unit 534 may be physically included within the computing device 510 (e.g., a fixedly installed touchscreen), or may be operatively coupled with the computing device 510 by other means (e.g., a peripheral touch pad, mouse, keyboard, etc. connected to the computing device 510 by wired and/or wireless means).

The computing device 510 may include a speaker 542, a microphone 544, and/or a camera 546. In some embodiments, the computing device 510 may include still other sensor components, e.g., a positioning unit (e.g., GPS), an accelerometer, a gyroscope, etc. The speaker 542, microphone 544, camera 546, and/or other sensor component(s) may be physically included within the computing device 510 (e.g., a natively installed speaker, microphone, or camera), and/or may be operatively coupled with the computing device 510 by other means (e.g., a peripheral camera, speaker, or microphone connected to the computing device 510 by wired and/or wireless means).

Collectively, the display unit 532, input unit 534, speaker 542, microphone 544, camera 546, and/or other sensing component(s) may provide one or more user interfaces of the computing device 510. For example, the display unit 532 may display/present one or more graphical user interfaces (GUIs) which may include interactive controls that the user of the computing device 510 can activate via the input device 534 to cause functionalities described herein to be performed (e.g., via a touchscreen tap or swipe, a mouse click, a keyboard stroke, etc.). Additionally or alternatively, in some embodiments, similar user interfaces may be provided at least partially by the speaker 542, microphone 544, camera 546, and/or other sensing components of the computing device 510 (e.g., an interactive audio interface, a gesture-based user interface, or a user interface responsive to physical movement of the computing device 510). In some embodiments, a user of the live event application 530 at the computing device 510 may configure device permissions defining components of the computing device 510 the live event application 530 may use to provide GUIs, provide notifications, and/or perform other functionalities.

The one or more servers 514 (i.e., one or more servers, e.g., the event server 124 and/or other servers of FIG. 1) include a memory 552, which may include one or more non-transitory memories (e.g., ROM) and/or one or more volatile memories (e.g., RAM). In particular, non-transitory portions of the memory 552 may store non-transitory, computer executable instructions that are executable by a processor 554 (i.e., one or more processors) to cause the computing device 510 to perform actions described in this detailed description. Non-transitory portions of the memory 552 may include, for example, one or more applications containing non-transitory instructions for controlling logic and communications relating to live events, user profiles, device configuration information, analytics, etc. The memory 552 may further include one or more APIs configured to control communications between the one or more servers 514 and the computing device 510. Still additionally or alternatively, the memory 552 may store a profile registry 558, which may store various information described herein as relating to user profiles. Still yet additionally or alternatively, the memory 552 may store an item catalogue 560, e.g., defining known items for easier inclusion in live events (e.g., as described with respect to the item catalogue server 132 of FIG. 1).

The network 518 may include any suitable one or more communications networks, e.g., the Internet, a wired or wireless local area network (LAN), etc. Communications over the network 518 may include communications according to any suitable one or more communications protocols, including for example a cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of the computing device 510 and/or the one or more servers 514.

Various additional and/or alternative computing elements may be envisioned, in various embodiments. In particular, it should be understood that the one or more servers 514 may communicate over the network 518 with many computing devices 514, e.g., belonging to various combinations of hosts and/or guests.

Exemplary Computer-Implemented Methods

Figure 6:
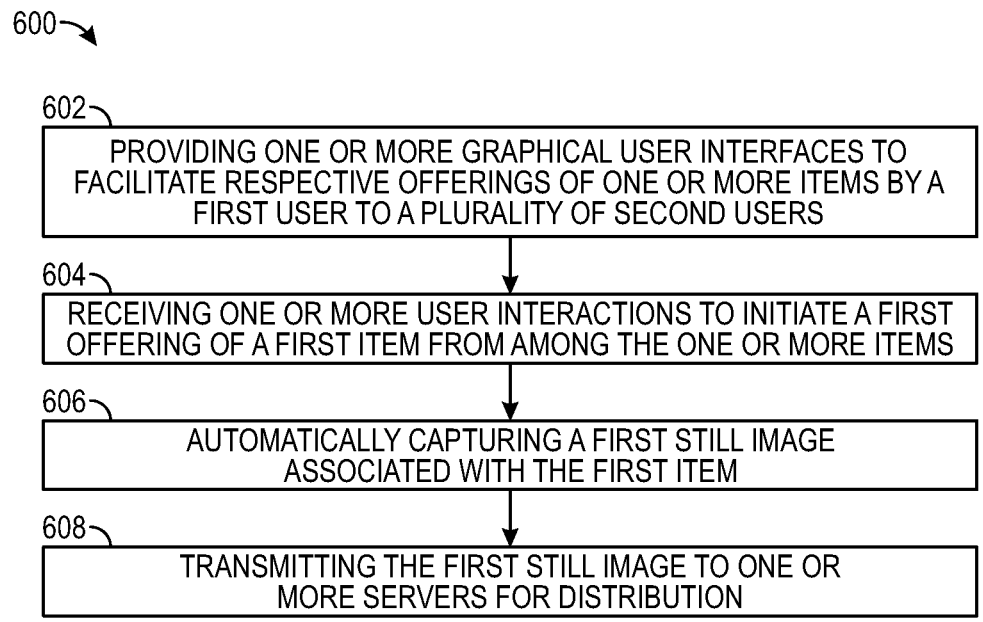
FIG. 6 is a flow diagram of an example method implemented via a client computing device.

FIG. 6 depicts a block diagram of an example computer-implemented method 600 associated with automatically capturing one or more images of an item being offered in a live event (e.g., one or more auctions, one or more offers for direct purchase, and/or one or more giveaways). The method 600 may be performed, for example, by a client computing device of a host user in accordance with techniques of the present description. The client computing device, for example, may be a host device 110a, 202, 402, and/or 510 as described in foregoing sections of the present description.

In embodiments, one or more memories of the client computing device may store non-transitory, computer executable instructions that, when executed via one or more processors of the client computing device, cause the client computing device to perform actions of the method 600. Furthermore, in some embodiments, one or more non-transitory computer readable media may be provided (e.g., a non-removable computer memory, a removable flash drive, etc.), the one or more non-transitory computer readable media storing instructions that, when executed by the client computing device, cause the client computing device to perform actions of the method 600. Order of actions of the method 600 may vary from the order depicted in FIG. 6, and actions of the method 600 may be combined and/or substituted with other actions described in the present description, in various embodiments.

The method 600 may include providing, via a display of a first client computing device of a first user (e.g., a host device), one or more graphical user interfaces to facilitate respective offerings of one or more items by the first user to one or more second users at respective ones of a second plurality of client computing devices (e.g., one or more guest devices) (602). In some embodiments, the offerings of the one or more items can be made prior to a live event (e.g., by a video offering, or by a continuous offering on the host's profile). Additionally or alternatively, in some embodiments, the offerings of the one or more items can be made during a live event. Further, the one or more graphical user interfaces need not be the graphical user interfaces described herein.

The method 600 may further include receiving, via the one or more graphical user interfaces presented at the display of the first client computing device, one or more user interactions to initiate a first offering of a first item from among the one or more items (604). For example, the host may select the "Start Auction" interactive GUI element 216 (as illustrated in FIG. 2A) of the GUI to start an auction offering. As another example, the host may select the "pin" option 235 of the GUI to pin an item for direct purchase (as illustrated in FIG. 2C) and/or the "pin" option 254 of the GUI to pin an item for a giveaway (as illustrated in FIG. 2E).

The method 600 may further include automatically capturing, via a camera unit of the first client computing device, a first still image associated with the first item, wherein automatically capturing the first still image is performed preceding, concurrent, or subsequent to receiving the one or more user interactions to initiate the first offering of the first item (606). The automatic capturing of the first still image may be performed either by the first client computing device or by one or more servers (either by remotely controlling the first client computing device or by sending executable instructions to the first client computing device). Further, the first still image need not be the only still image that is automatically captured. For example, other images (e.g., burst images and/or video recordings) may also be automatically captured. In these instances, either the first client computing device or the one or more servers may select the first still image from among the multiple images captured.

The method 600 may yet further include, transmitting, via one or more processors of the first client computing device, the first still image to one or more servers (608). In the embodiments where more than one images is automatically captured, the first client computing device may transmit the multiple images to the one or more servers. The one or more servers may then select one or more images from the multiple images. As previously described, the one or more servers may process the one or more images in a plethora of ways.

The method 600 may include additional, fewer, and/or alternate actions, in various embodiments. Further, the method 600 may be performed in different orders than the one described above. In some embodiments, the method 600 may include obtaining a video stream associated with the live event, via a camera unit associated with the client computing device (e.g., an internal camera or a peripheral camera). In these embodiments, the method 600 may include transmitting the video stream to the one or more servers (e.g., such that the one or more servers can distribute the video stream in real-time to guest devices to create a video-enabled live event.

Figure 7:
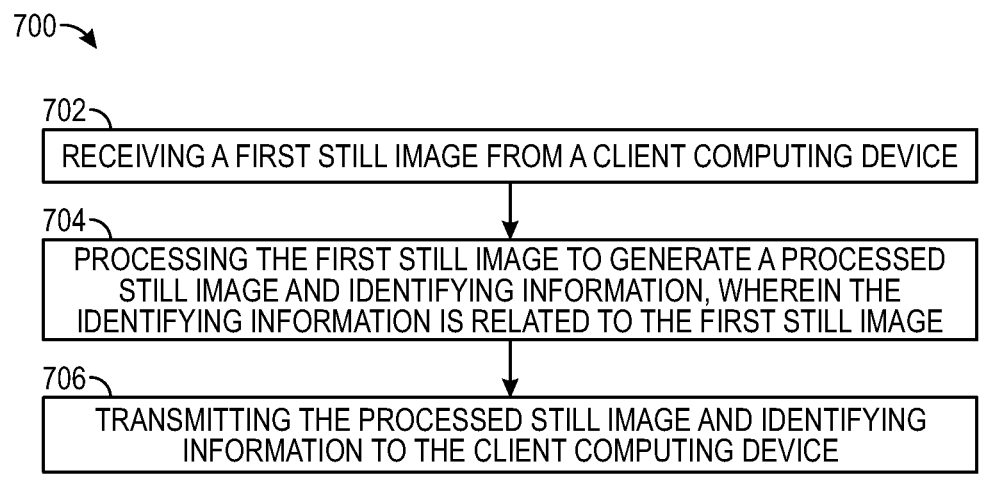
FIG. 7 is a flow diagram of an example method implemented via one or more servers.

FIG. 7 depicts a block diagram of an example computer-implemented 700 associated with automatically capturing and/or processing one or more images of an item being offered in a live event (e.g., one or more auctions, one or more offers for direct purchase, and/or one or more giveaways). The method 700 may be performed, for example, by one or more servers in accordance with techniques of the present description. The one or more servers, for example, may be one or more servers 124, 128, 132, 134 and/or 514 as described in foregoing sections of the present description.

In embodiments, one or more memories of the one or more servers may store non-transitory, computer executable instructions that, when executed via one or more processors of the one or more servers, cause the one or more servers to perform actions of the method 700. Furthermore, in some embodiments, one or more non-transitory computer readable media may be provided (e.g., a non-removable computer memory, a removable flash drive, etc.), the one or more non-transitory computer readable media storing instructions that, when executed by the one or more servers, cause the one or more servers to perform actions of the method 700. Order of actions of the method 700 may vary from the order depicted in FIG. 7, and actions of the method 700 may be combined and/or substituted with other actions described in the present description, in various embodiments.

The method 700 may include receiving, via one or more processors of one or more servers, one or more images of items in connection with an item offering (702). In some embodiments, the item offering may be associated with a live event. In some embodiments, the one or more servers may direct a first client computing device (e.g., a host device) to capture the one or more images automatically at a designated time (e.g., upon the initiation of a live event, upon the initiation of an item offering, a designated amount of time thereafter, etc.). The one or more images may include a single image, a burst image, and/or a video. In some embodiments, the one or more images are captured from one or more frames from a real-time video stream.

The method 700 may further include determining, via the one or more processors of the one or more servers, the quality of the one or more images (704). Determining the quality of the one or more images may be performed by a number of different methods, such as focus operators, machine learning algorithms, and/or the like. The one or more servers may compare the determined quality of the one or more images to a set value threshold. If the determined quality of the one or more images falls below a set threshold value, the one or more servers may send instructions to the first client computing device to capture another image and/or series of images. This process may repeat until an image of sufficient quality (i.e., an image that meets the set threshold value) has been obtained by the one or more servers, a first user (e.g., host) of the first client computing device cancels the process (e.g., by canceling the live event), or the first user overrides the one or more servers (e.g., the host transmits an indication to the one or more servers to use the most recent image captured even if it is below the set threshold value).

The method 700 may yet further include analyzing, via the one or more processors of the one or more servers, the one or more images to generate a processed image (706). Analyzing the one or more images may include selecting a single image from a multitude of images and/or processing the one or more images for identifying information. The processed image may include the one or more images, the selected single image, and/or the identifying information. The identifying information may include names and/or titles of the item, description of the item, dimensions of the item, images of the item, manufacturer and/or distributor information of the item, publication information (if applicable), copyright information (if applicable), collector information (e.g., set information, rarity information, date of release, etc.), logos and/or trademarks (and/or other branding) related to the item (and/or manufacturers and/or distributors of the item), etc. Processing the one or more images for identifying information may include performing some form of image recognition (or machine vision) on the one or more images and/or selected single image to classify, categorize, recognize and/or otherwise identify the item being offered by the one or more servers in order to either gather identifying information from one or more databases or automatically generate identifying information (e.g., via script writing artificial intelligence).

The method 700 may further include transmitting, via the one or more processors of the one or more servers, the processed image to one or more client devices (708) (e.g., the first client computing device and/or one or more second client computing devices). The method 700 may further include populating, via the one or more processors of the one or more servers, a record of the first item with the processed image, wherein subsequent returns of inquires related to the first item include the processed image.

The method 700 may include additional, fewer, and/or alternate actions, in various embodiments. Further, the method 700 may be performed in different orders than the one described above.

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are depicted and described as separate operations, one or more of the individual operations may be performed concurrently, and nothing requires that the operations be performed in the order depicted. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as one or more servers farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or one or more servers farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout the present disclosure, embodiments are described in which various elements are optional—present in some, but not all, embodiments of the system. Where such elements are depicted in the accompanying figures and, specifically, in figures depicting block diagrams, the optional elements are generally depicted in dotted lines to denote their optional nature.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for generating dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims. The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method comprising:
receiving, via one or more graphical user interfaces presented at a display of a first client computing device of a first user, one or more identifications of one or more items to be offered by the first user to one or more second users at respective ones of a second plurality of client computing devices;

receiving, via the one or more graphical user interfaces presented at the display of the first client computing device, one or more user interactions to initiate a first offering of a first item from among the one or more items;

based on the receiving of the one or more identifications of one or more items to be offered, automatically capturing, via a camera unit of the first client computing device, a first still image associated with the first item, wherein automatically capturing the first still image is performed:

preceding, concurrent, or subsequent to receiving the one or more user interactions to initiate the first offering of the first item, and without requiring a user interaction associated with automatically capturing the first still image; and transmitting, via one or more processors of the first client computing device, the first still image to one or more servers.

2. The computer-implemented method of claim 1, further comprising:

obtaining, via the camera unit of the first client computing device, a video stream, wherein the first still image is a still frame from a plurality of still frames from among the video stream; and transmitting, via the one or more processors of the first client computing device, the video stream to the one or more servers for distribution to the second plurality of client computing devices.

3. The computer-implemented method of claim 1, further comprising:

analyzing, via the one or more processors of the first client computing device, the first still image to determine a quality of the first still image;

automatically capturing, via the camera unit of the first client computing device, a second still image associated with the first item; and transmitting, via one or more processors of the first client computing device, the second still image to the one or more servers.

4. The computer-implemented method of claim 3, wherein analyzing the first still image further comprises determining the quality of the first still image has exceeded a predetermined threshold, and wherein capturing the second still image occurs in response to the quality of the first still image not exceeding the predetermined threshold.

5. The computer-implemented method of claim 1, further comprising:

upon receiving the one or more user interactions, displaying, via the one or more graphical user interfaces presented at the display of the first client computing device, a timer that counts and displays a threshold amount of time; and determining, via the one or more processors of the first client computing device, the timer has reached the threshold amount of time, wherein automatically capturing the first still image occurs upon determining the timer has reached the threshold amount of time.

6. The computer-implemented method of claim 1, further comprising:

receiving, via the one or more processors of the first client computing device from the one or more servers, a processed still image, wherein the processed still image is derived from the first still image;

receiving, via the one or more graphical user interfaces presented at the display of the first client computing device, one or more further user interactions to display the first offering of the first item from among the one or more items; and upon receiving the one or more further user interactions, displaying, via the one or more graphical user interfaces presented at the display of the first client computing device, a listing of the one or more items and the processed still image.

7. The computer-implemented method of claim 6, further comprising:

populating, via the one or more processors of the first client computing device, a record of the first item with the processed still image, wherein subsequent returns of inquires related to the first item include the processed still image.

8. The computer-implemented method of claim 7, further comprising:

receiving, via the one or more processors of the first client computing device from the one or more servers, identifying information related to the first item, wherein the identifying information was derived from the processed still image.

9. A first client computing device of a first user comprising:

one or more processors;

a camera unit;

a display; and one or more memories storing non-transitory instructions that, when executed via the one or more processors, cause the first client computing device to:

receive, via one or more graphical user interfaces presented at the display, one or more identifications of one or more items to be offered by the first user to one or more second users at respective ones of a second plurality of client computing devices;

receive, via the one or more graphical user interfaces presented at the display, one or more user interactions to initiate a first offering of a first item from among the one or more items;

based on the receiving of the one or more identifications of one or more items to be offered, automatically capture, via the camera unit, a first still image associated with the first item, wherein automatically capturing the first still image is performed:

preceding, concurrent, or subsequent to receiving the one or more user interactions to initiate the first offering of the first item, and without requiring a user interaction associated with automatically capturing the first still image; and transmit the first still image to one or more servers for distribution to the second plurality of client computing devices.

10. The first client computing device of claim 9, wherein the one or more memories storing non-transitory instructions that, when executed via the one or more processors, further cause the first client computing device to:

obtain, via the camera unit of the first client computing device, a video stream, wherein the first still image is a still frame from a plurality of still frames from among the video stream; and transmit the video stream to the one or more servers for distribution to the second plurality of client computing devices.

11. The first client computing device of claim 9, wherein the one or more memories storing non-transitory instructions that, when executed via the one or more processors, further cause the first client computing device to:
analyze the first still image to determine a quality of the first still image has exceeded a predetermined threshold;
upon the quality of the first still image not exceeding the predetermined threshold, automatically capture, via the camera unit, a second still image associated with the first item; and
upon capturing the second still image, transmit the second still image to the one or more servers for distribution to the second plurality of client computing devices.

12. The first client computing device of claim 9, wherein the one or more memories storing non-transitory instructions that, when executed via the one or more processors, further cause the first client computing device to:
upon receiving the one or more user interactions, automatically display, via the one or more graphical user interfaces presented at the display of the first client computing device, a timer that counts and displays a threshold amount of time; and
determine the timer has reached the threshold amount of time,
wherein automatically capturing the first still image occurs upon determining the timer has reached the threshold amount of time.

13. The first client computing device of claim 9, wherein the one or more memories storing non-transitory instructions that, when executed via the one or more processors, further cause the first client computing device to:
receive, from the one or more servers, a processed still image, wherein the processed still image is derived from the first still image;
receive, via the one or more graphical user interfaces presented at the display, one or more further user interactions to display the first offering of the first item from among the one or more items; and
upon receiving the one or more further user interactions, automatically display, via the one or more graphical user interfaces presented at the display, a listing of the one or more items and the processed still image.

14. The first client computing device of claim 13, wherein the one or more memories storing non-transitory instructions that, when executed via the one or more processors, further cause the first client computing device to:
populate a record of the first item with the processed still image, wherein subsequent returns of inquires related to the first item include the processed still image.

15. The first client computing device of claim 14, wherein the one or more memories storing non-transitory instructions that, when executed via the one or more processors, further cause the first client computing device to:
receive, from the one or more servers, identifying information related to the first item, wherein the identifying information was derived from the processed still image.

16. One or more non-transitory computer readable media storing instructions that, when executed via one or more processors of a first client computing device of a first user, cause the first client computing device to:
receive, via one or more graphical user interfaces presented at a display, one or more identifications of one or more items to be offered by the first user to one or more second users at respective ones of a second plurality of client computing devices;
receive, via the one or more graphical user interfaces presented at the display, one or more user interactions to initiate a first offering of a first item from among the one or more items;
based on the receiving of the one or more identifications of one or more items to be offered, automatically capture, via a camera unit, a first still image associated with the first item, wherein automatically capturing the first still image is performed:
preceding, concurrent, or subsequent to receiving the one or more user interactions to initiate the first offering of the first item, and
without requiring a user interaction associated with automatically capturing the first still image; and
transmit the first still image to one or more servers for distribution to the second plurality of client computing devices.

17. The one or more computer readable media of claim 16, wherein the instructions, when executed via the one or more processors, further cause the first client computing device to:
obtain, via the camera unit of the first client computing device, a video stream, wherein the first still image is a still frame from a plurality of still frames from among the video stream; and
transmit the video stream to the one or more servers for distribution to the second plurality of client computing devices.

18. The one or more non-transitory computer readable media of claim 16, wherein the instructions, when executed via the one or more processors, further cause the first client computing device to:
analyze the first still image to determine a quality of the first still image has exceeded a predetermined threshold;
upon the quality of the first still image not exceeding the predetermined threshold, automatically capture, via the camera unit, a second still image associated with the first item; and
upon capturing the second still image, transmit the second still image to the one or more servers for distribution to the second plurality of client computing devices.

19. The one or more non-transitory computer readable media of claim 16, wherein the instructions, when executed via the one or more processors, further cause the first client computing device to:
upon receiving the one or more user interactions, automatically display, via the one or more graphical user interfaces presented at the display of the first client computing device, a timer that counts and displays a threshold amount of time; and
determine the timer has reached the threshold amount of time,
wherein automatically capturing the first still image occurs upon determining the timer has reached the threshold amount of time.

20. The one or more non-transitory computer readable media of claim 16, wherein the instructions, when executed via the one or more processors, further cause the first client computing device to:
receive, from the one or more servers, a processed still image, wherein the processed still image is derived from the first still image;
receive, via the one or more graphical user interfaces presented at the display, one or more further user interactions to display the first offering of the first item from among the one or more items;

upon receiving the one or more further user interactions, automatically display, via the one or more graphical user interfaces presented at the display, a listing of the one or more items and the processed still image;

populate a record of the first item with the processed still image, wherein subsequent returns of inquires related to the first item include the processed still image; and receive, from the one or more servers, identifying information related to the first item, wherein the identifying information was derived from the processed still image.

* * * * *